United States Patent
Mihara et al.

(10) Patent No.: US 12,038,750 B2
(45) Date of Patent: Jul. 16, 2024

(54) CONTROL DEVICE AND CONTROL METHOD FOR A MOVABLE BODY

(71) Applicant: SONY CORPORATION, Tokyo (JP)

(72) Inventors: Hajime Mihara, Tokyo (JP); Andrew Shin, Tokyo (JP); Tetsuya Narita, Tokyo (JP); Kazuo Hongo, Tokyo (JP); Masanobu Nakamura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 695 days.

(21) Appl. No.: 17/250,305

(22) PCT Filed: Jun. 25, 2019

(86) PCT No.: PCT/JP2019/025041
§ 371 (c)(1),
(2) Date: Dec. 31, 2020

(87) PCT Pub. No.: WO2020/012944
PCT Pub. Date: Jan. 16, 2020

(65) Prior Publication Data
US 2021/0165412 A1    Jun. 3, 2021

(30) Foreign Application Priority Data
Jul. 9, 2018    (JP) .................................. 2018-129910

(51) Int. Cl.
*G05D 1/00*    (2024.01)
(52) U.S. Cl.
CPC ......... *G05D 1/0214* (2013.01); *G05D 1/0251* (2013.01); *G05D 1/106* (2019.05)

(58) Field of Classification Search
CPC .......................... G05D 1/0214; G05D 1/0251
USPC ........................................................... 701/26
See application file for complete search history.

(56) References Cited

U.S. PATENT DOCUMENTS

| | | | | |
|---|---|---|---|---|
| 7,844,398 B2 * | 11/2010 | Sato | ....................... | B25J 9/1666 |
| | | | | 700/214 |
| 9,827,678 B1 * | 11/2017 | Gilbertson | .......... | A47L 11/4055 |
| 2009/0024357 A1 | 1/2009 | Aso et al. | | |
| 2010/0217528 A1 | 8/2010 | Sato et al. | | |
| 2014/0303883 A1 | 10/2014 | Aso et al. | | |

(Continued)

FOREIGN PATENT DOCUMENTS

| | | |
|---|---|---|
| CN | 101395647 A | 3/2009 |
| CN | 101959653 A | 1/2011 |

(Continued)

OTHER PUBLICATIONS

International Search Report and Written Opinion of PCT Application No. PCT/JP2019/025041, dated Aug. 20, 2019, 11 pages of ISRWO.

*Primary Examiner* — Isaac G Smith
(74) *Attorney, Agent, or Firm* — CHIP LAW GROUP

(57) ABSTRACT

The present technology relates to a control device, a control method, and a program that enable the action of a movable body to be planned in accordance with the value of a peripheral object. The control device according to an embodiment of the present technology estimates a value of an object at the periphery of a movable body on the basis of sensor data detected by the movable body, and plans an action of the movable body on the basis of the value of the object estimated. The present technology is applicable to robots capable of acting autonomously.

19 Claims, 27 Drawing Sheets

(56) References Cited

U.S. PATENT DOCUMENTS

| | | | | |
|---|---|---|---|---|
| 2015/0120094 A1* | 4/2015 | Kimchi | ................ | G01C 21/20 |
| | | | | 701/3 |
| 2016/0320777 A1* | 11/2016 | Yun | .................... | G05D 1/0238 |
| 2017/0341645 A1 | 11/2017 | Sugita et al. | | |
| 2019/0164218 A1 | 5/2019 | Miyajima | | |
| 2019/0202449 A1* | 7/2019 | Taveira | ............... | G05D 1/0202 |

FOREIGN PATENT DOCUMENTS

| | | |
|---|---|---|
| CN | 109416809 A | 3/2019 |
| EP | 1990786 A1 | 11/2008 |
| EP | 3486856 A1 | 5/2019 |
| JP | 2005-032196 A | 2/2005 |
| JP | 2007-230454 A | 9/2007 |
| JP | 2017-211909 A | 11/2017 |
| WO | 2007/102367 A1 | 9/2007 |
| WO | 2010/004744 A1 | 1/2010 |
| WO | 2018/012073 A1 | 1/2018 |

* cited by examiner

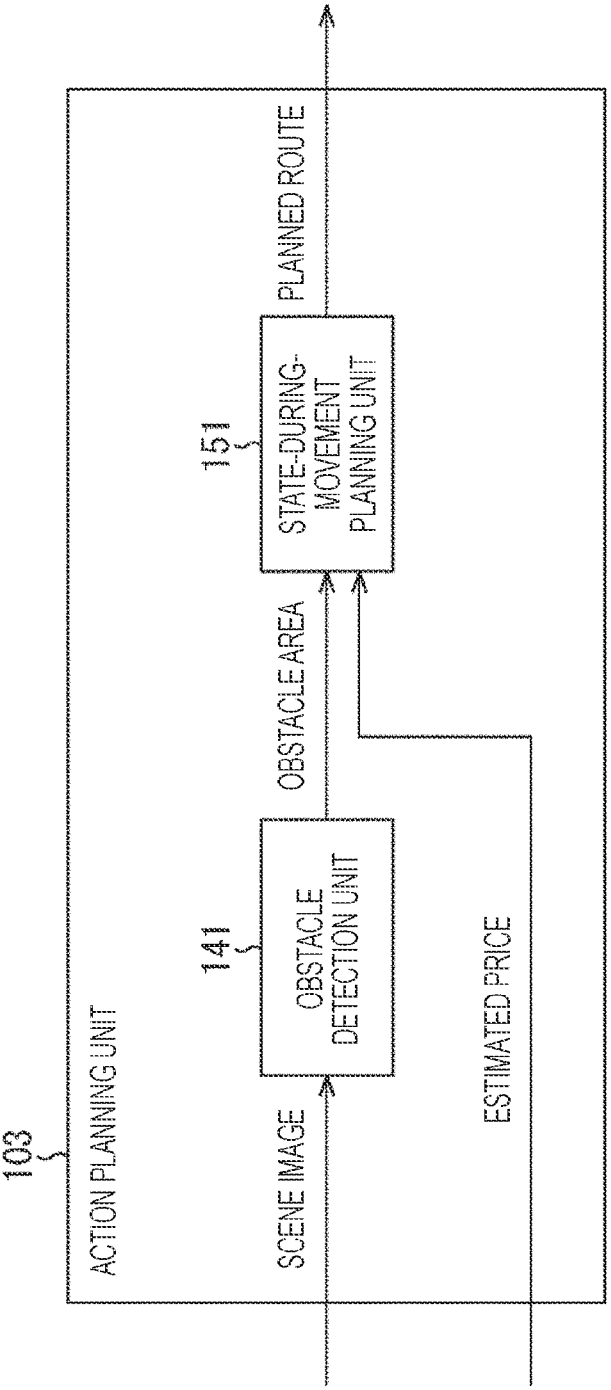

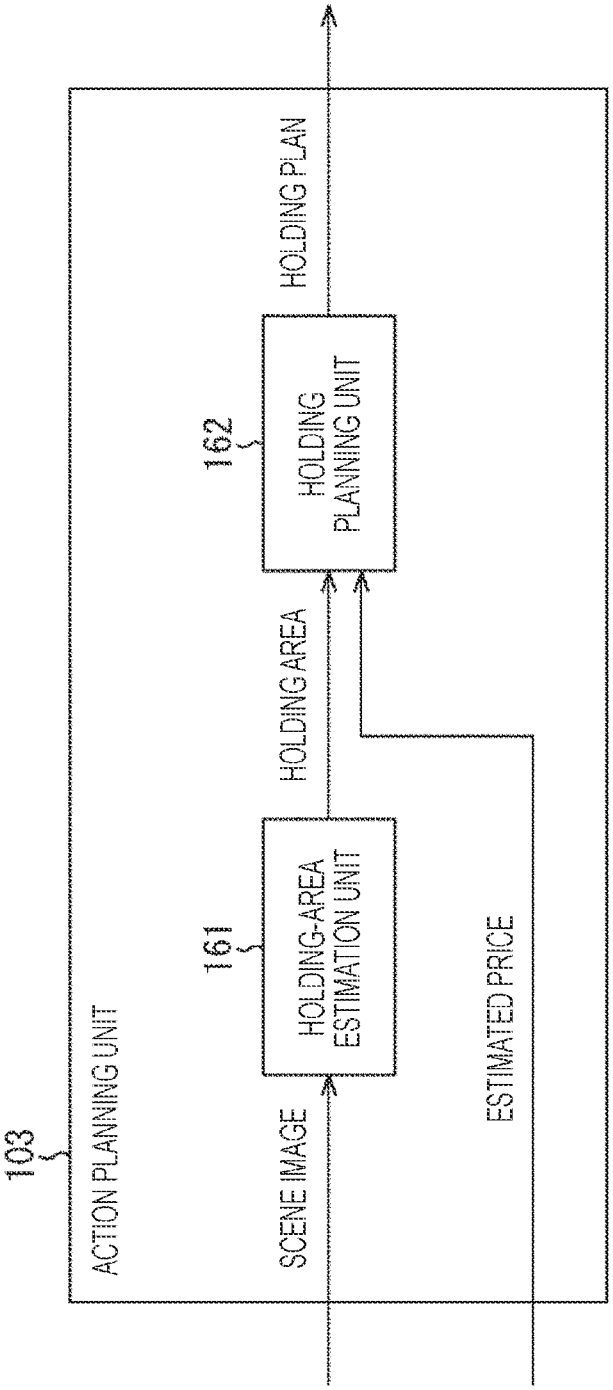

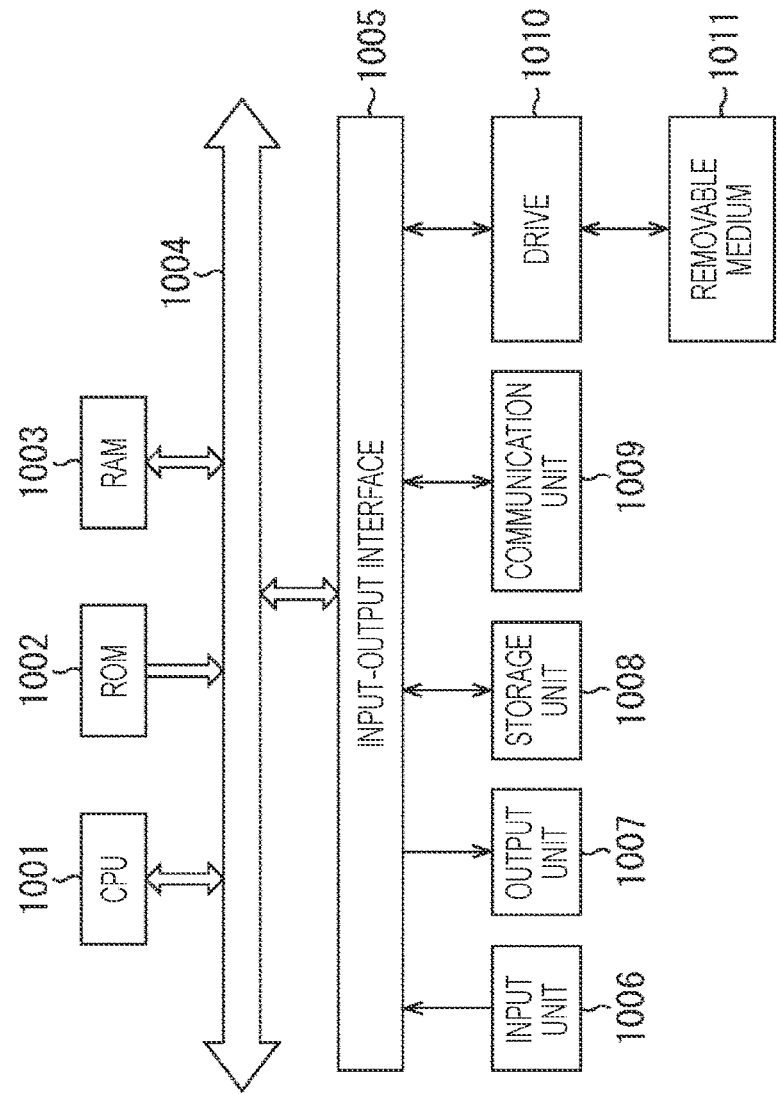

CONTROL DEVICE AND CONTROL METHOD FOR A MOVABLE BODY

CROSS REFERENCE TO RELATED APPLICATIONS

This application is a U.S. National Phase of International Patent Application No. PCT/JP2019/025041 filed on Jun. 25, 2019, which claims priority benefit of Japanese Patent Application No. JP 2018-129910 filed in the Japan Patent Office on Jul. 9, 2018. Each of the above-referenced applications is hereby incorporated herein by reference in its entirety.

TECHNICAL FIELD

The present technology relates to a control device, a control method, and a program, and particularly to a control device, a control method, and a program that enable the action of a movable body to be planned in accordance with the value of a peripheral object.

BACKGROUND ART

With advances of, for example, artificial intelligence (AI), robots that act autonomously in accordance with the peripheral environment are becoming widespread.

Patent Document 1 discloses a technique of planning a movement route of a robot in order to minimize damage when peripheral objects collide with each other. The movement route of the robot is planned in order to minimize, for example, damage and adhesion of odors due to collision between objects.

Patent Document 2 discloses a technique of planning an action in order to avoid the periphery of an object of which position and posture are uncertain. For example, a grid map in which a weight corresponding to the uncertainty of the position and posture is set is generated to formulate a route.

CITATION LIST

Patent Document

Patent Document 1: International Publication No. 2010/004744
Patent Document 2: Japanese Patent Application Laid-Open No. 2005-032196

SUMMARY OF THE INVENTION

Problems to be Solved by the Invention

Various objects are present in the environment in which a robot acts, and their values are not the same. For objects valuable to the user, operations like careful handling including keeping away from the objects, holding the objects in a highly safe approach, and the like are required.

The present technology has been made in consideration of such a situation, and an object of the present technology is to enable planning the action of a movable body in accordance with the respective values of peripheral objects.

Solutions to Problems

The control device on one aspect of the present technology includes a value estimation unit configured to estimate a value of an object at a periphery of a movable body on the basis of sensor data detected by the movable body, and an action planning unit configured to plan an action of the movable body on the basis of the value of the object estimated.

In one aspect of the present technology, a value of an object at a periphery of a movable body is estimated on the basis of sensor data detected by the movable body, and an action of the movable body is planned on the basis of the value of the object estimated.

Effects of the Invention

According to the present technology, the action of a movable body can be planned in accordance with the value of each peripheral object.

Note that the effects described herein are not necessarily limited, and thus any of the effects described in the present disclosure may be applicable.

BRIEF DESCRIPTION OF DRAWINGS

FIG. 15 is a block diagram illustrating an exemplary configuration of an action planning unit that plans a state during movement.
FIG. 21 is a block diagram illustrating an exemplary configuration of an action planning unit that plans a holding manner.

FIG. 28 is a block diagram of an exemplary configuration of a computer.

MODE FOR CARRYING OUT THE INVENTION

Hereinafter, embodiments for carrying out the present technology will be described. The description will be given in the following order.

1. Action Plan based on Value of Object
2. Exemplary Configuration of Robot
3. Movement Route Plan
4. Plan regarding State during Movement
5. Plan of Holding Manner
6. Modifications <Action Plan Based on Value of Object>

Figure 1:
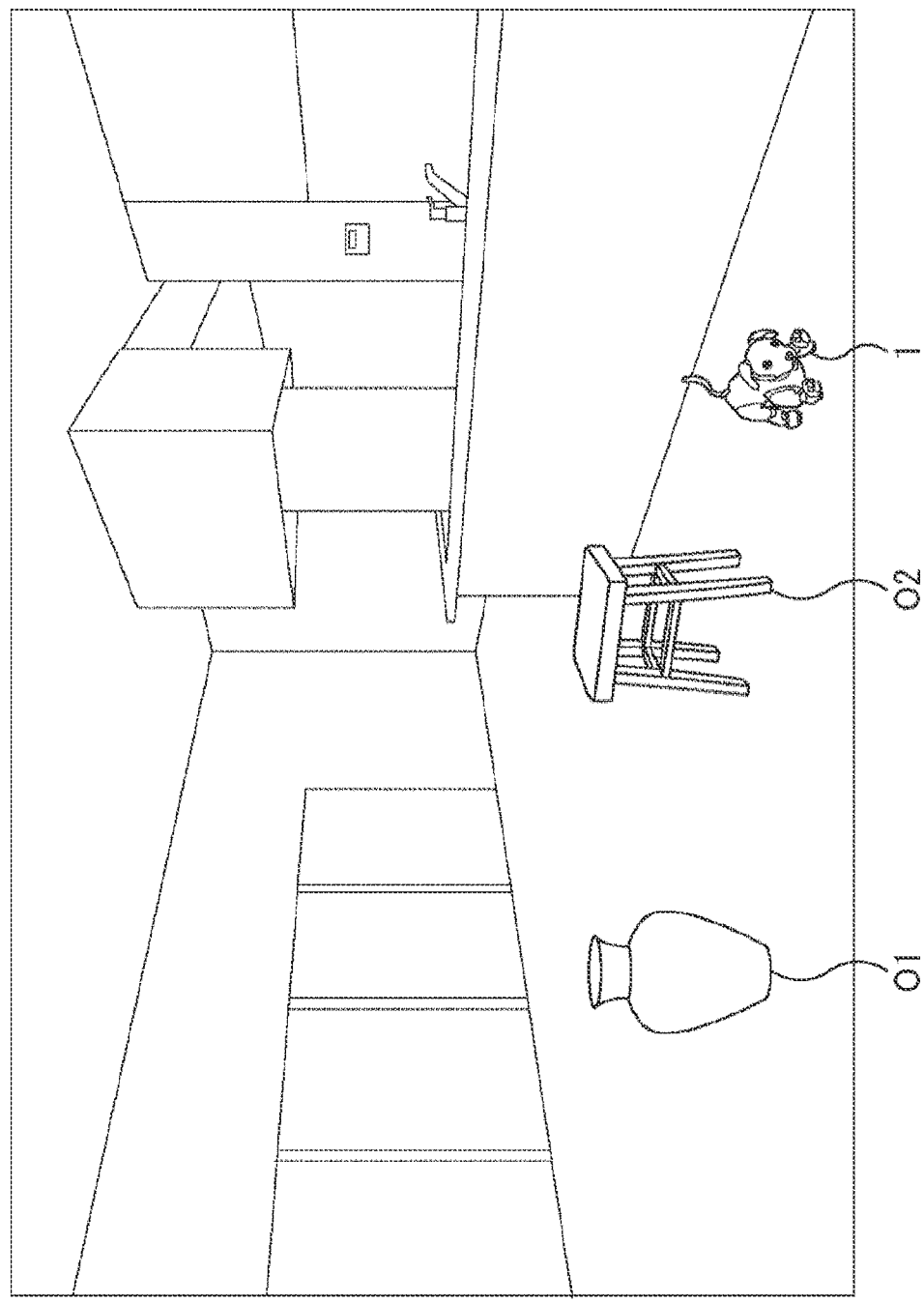
FIG. 1 illustrates an exemplary environment in which a robot acts according to an embodiment of the present technology.

FIG. 1 illustrates an exemplary environment in which a robot acts according to an embodiment of the present technology.

In the example of FIG. 1, a robot 1 is present in a room such as a living room. The robot 1 is a dog-shaped robot capable of quadrupedal walking.

The robot 1 executes a predetermined program with a built-in computer, and autonomously takes various types of actions including movement in accordance with a peripheral situation and the like. The robot 1 is a movable body capable of moving autonomously.

In this example, the robot capable of quadrupedal walking is regarded as a movable body. However, instead of the robot 1, there may be used any of various types of movable bodies capable of moving autonomously such as a robot capable of bipedal walking and a so-called drone that is an aircraft capable of unmanned flight.

Various objects are present in the room where the robot 1 acts. In the example of FIG. 1, a vase O1 and a chair O2 are placed on the floor at the periphery of the robot 1.

Various types of actions taken by the robot 1 are controlled in accordance with a plan generated by the robot 1 itself. In the robot 1, the value of each object captured in an image shot by a camera mounted on the robot 1 is estimated, and future actions are sequentially planned on the basis of the estimated value of the object.

For example, in a case where the destination is over the vase O1 and chair O2 and the vase O1 is more expensive than the chair O2, a route passing near the chair O2 and passing a position as far away as possible from the vase O1 is planned as a movement route.

After planning the movement route, the robot 1 will move to the destination so as to pass near the chair O2 and pass the position as far away as possible from the vase O1.

In such a manner, a movement route of the robot 1 is planned in consideration of the respective values of objects such as the price.

Autonomous action of the robot 1 may result in hitting of part of the body of the robot 1 against a peripheral object. Planning, as a movement route, a route passing a position as far away as possible from an expensive object enables reducing the possibility of hitting against and damaging such an expensive object.

Various types of action plans other than the movement route plan are also similarly set in consideration of the value of the object. As described later, a plan of a state during movement in the case of moving to the destination and a plan of a holding manner in the case of holding an object are set in consideration of the values of the objects.

In the following, there will be mainly described that the value of each object will be evaluated on the basis of the price of the object; however, an indicator for determining the value of the object is not limited to the price.

For example, the value of each object may be determined with the manufacturing time of the object, the owner of the object, the design of the object, the size of the object, and the color of the object as indicators.

In a case where the manufacturing time of an object is used as an indicator, for example, a new object is evaluated as having a higher value, and an old object is evaluated as having a lower value than the new object.

In addition, in a case where the owner of an object is used as an indicator, an object of which owner is an adult is evaluated as having a higher value, and an object of which owner is a child is evaluated as having a lower value than the object of which owner is the adult.

The user himself/herself may be allowed to set the value of each object in the environment in which the robot 1 acts. Even in the case of an object having a low value on the basis of an objective indicator, for example the price, such an object may have a high value depending on the subjectivity of the user. Allowing the user himself/herself to set the value of each object makes it possible for the robot 1 to handle carefully various types of objects valuable to the user.

<Exemplary Configuration of Robot>

Figure 2:
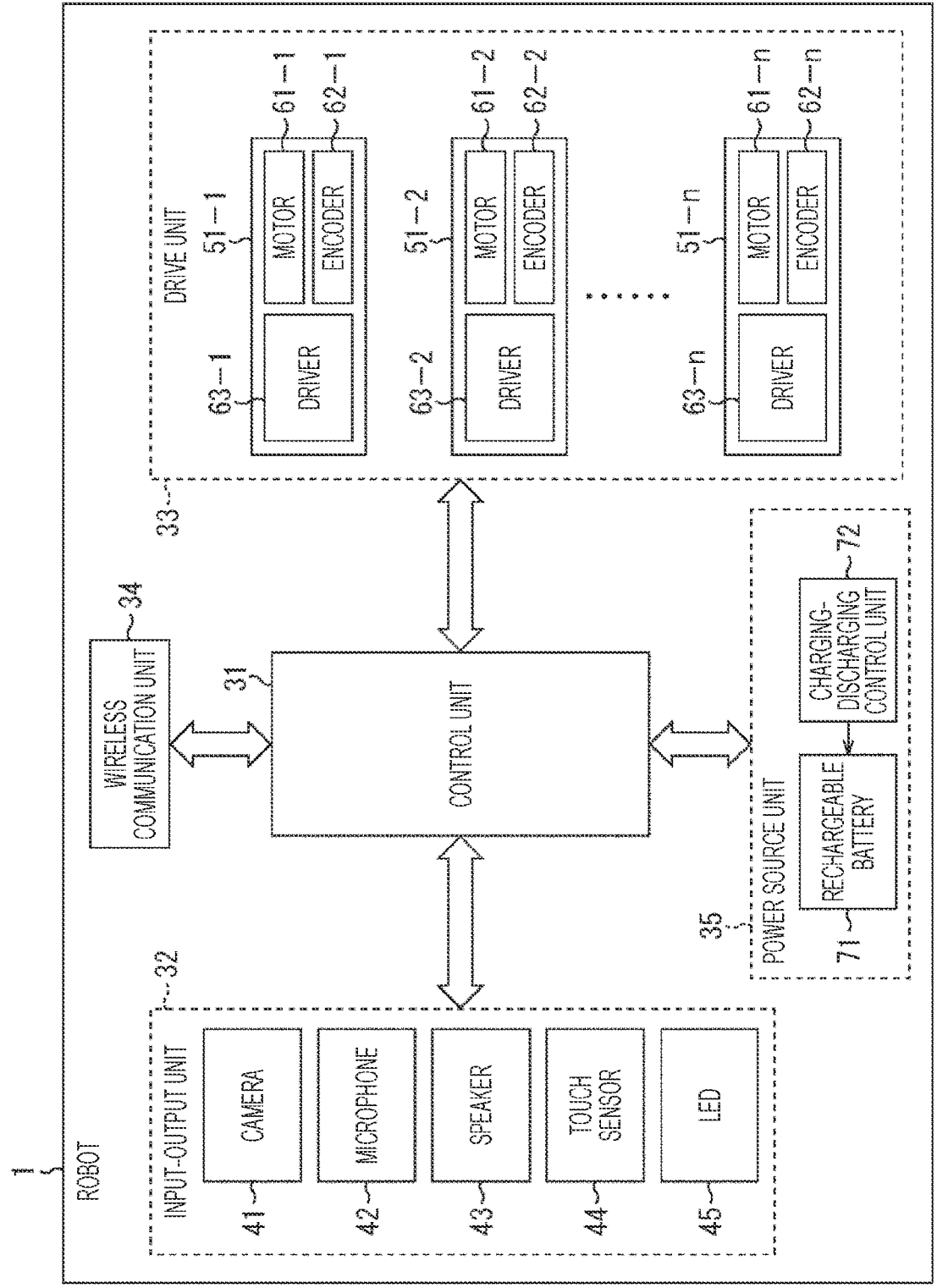
FIG. 2 is a block diagram illustrating an exemplary hardware configuration of the robot.

FIG. 2 is a block diagram illustrating an exemplary hardware configuration of the robot 1.

As illustrated in FIG. 2, the robot 1 includes a control unit 31, an input-output unit 32, a drive unit 33, a wireless communication unit 34, and a power source unit 35. The input-output unit 32, the drive unit 33, the wireless communication unit 34, and the power source unit 35 are connected to the control unit 31.

The control unit 31 includes a computer having a central processing unit (CPU), a read only memory (ROM), a random access memory (RAM), a flash memory, and the like. The CPU of the control unit 31 executes a predetermined program and controls the overall operation of the robot 1. The computer included in the control unit 31 functions as a control device that controls the operation of the robot 1.

For example, the control unit 31 recognizes peripheral objects on the basis of a shot image supplied from a camera 41 of the input-output unit 32, and estimates the price of the object. The control unit 31 plans an action on the basis of the estimated price of the object, and controls each constituent of the drive unit 33 such that the action according to the plan is taken.

The input-output unit 32 includes the camera 41, a microphone 42, a speaker 43, a touch sensor 44, and a light emitting diode (LED) 45.

The camera 41 corresponds to each eye of the robot 1 and sequentially shoots the peripheral environment. The camera 41 outputs, to the control unit 31, data of the shot image that is a still image or a moving image obtained by shooting.

The microphone 42 corresponds to each ear of the robot 1 and detects environmental sound. The microphone 42 outputs data of the environmental sound to the control unit 31.

The speaker 43 corresponds to the mouth of the robot 1 and outputs a predetermined sound such as a spoken voice, an effect sound, and background music (BGM).

The touch sensor 44 is provided at a predetermined part such as the head or the back. The touch sensor 44 detects contact by the user, and outputs information representing the details of the contact by the user to the control unit 31.

The LED 45 is provided at each part of the robot 1, for example, at the position of each eye. The LED 45 emits light in accordance with control by the control unit 31 and presents information to the user. Instead of the LED 45, a small display such as a liquid crystal display (LCD) or an organic electroluminescent (EL) display may be provided. Various types of images of each eye may be displayed on a display provided at the position of the eye, so that various types of facial expressions may be expressed.

The input-output unit 32 is provided with various types of modules such as a range sensor that measures a distance to each peripheral object and a positioning sensor such as a global positioning system (GPS).

The drive unit 33 drives in accordance with control by the control unit 31 and achieves an action of the robot 1. The drive unit 33 includes a plurality of drive units provided for each joint shaft for roll, pitch, yaw, or the like.

The drive units are provided one-to-one, for example, at the joints of the robot 1. The drive units each include the combination of a motor that rotates axially, an encoder that detects the rotational position of the motor, and a driver that adaptively controls the rotational position and rotational speed of the motor on the basis of the output of the encoder. The hardware configuration of Robot 1 is determined by, for example, the number of drive units and the positions of the drive units.

In the example of FIG. 2, drive units 51-1 to 51-$n$ are provided. For example, the drive unit 51-1 includes a motor 61-1, an encoder 62-1, and a driver 63-1. The drive units 51-2 to 51-$n$ each also has a configuration similar to that of the drive unit 51-1.

The wireless communication unit 34 is a wireless communication module such as a wireless local area network (LAN) module and a mobile communication module compatible with long term evolution (LTE). The wireless communication unit 34 communicates with a device connected to an indoor network or an external device such as a server on the Internet. The wireless communication unit 34 transmits data supplied from the control unit 31 to the external device, and receives data transmitted from the external device.

The power source unit 35 supplies power to each constituent in the robot 1. The power source unit 35 includes a rechargeable battery 71 and a charging-discharging control unit 72 that manages the charging-discharging state of the rechargeable battery 71.

Figure 3:
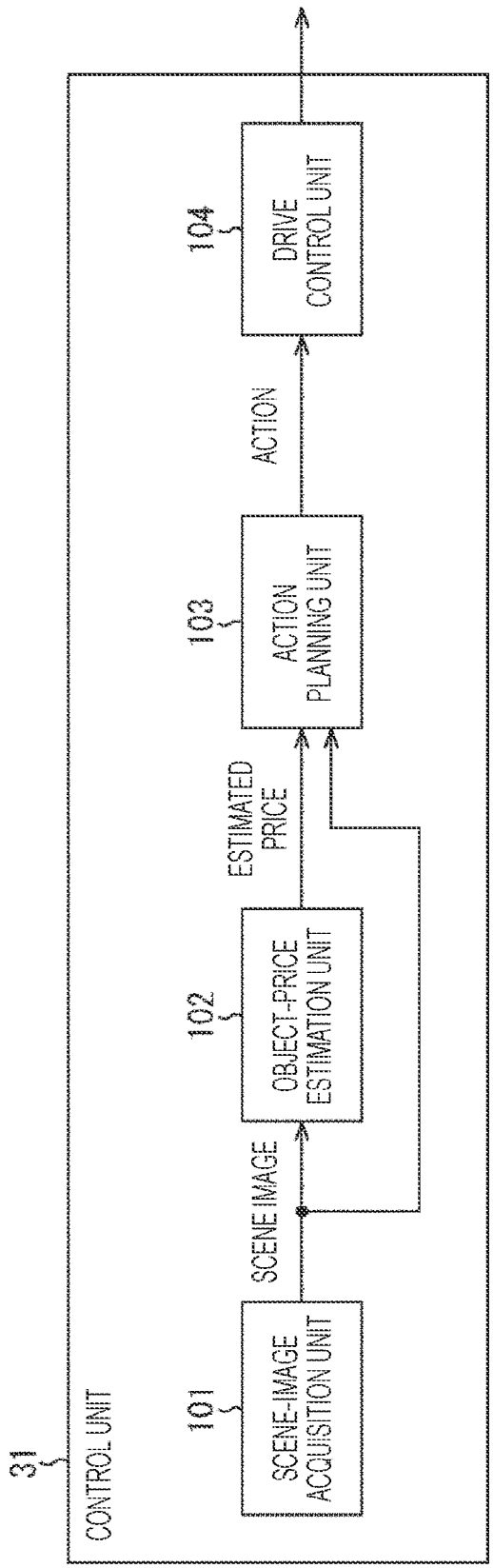
FIG. 3 is a block diagram illustrating an exemplary functional configuration of a control unit.

FIG. 3 is a block diagram illustrating an exemplary functional configuration of the control unit 31.

As illustrated in FIG. 3, the control unit 31 includes a scene-image acquisition unit 101, an object-price estimation unit 102, an action planning unit 103, and a drive control unit 104. At least part of the functional units illustrated in FIG. 3 is achieved by execution of the predetermined program by the CPU included in the control unit 31.

The scene-image acquisition unit 101 acquires a shot image shot by the camera 41 as a scene image representing a peripheral situation (scene). The scene-image acquisition unit 101 acquires such a scene image repeatedly at a predetermined cycle. The scene image acquired by the scene-image acquisition unit 101 is supplied to the object-price estimation unit 102 and the action planning unit 103.

The object-price estimation unit 102 analyzes the scene image and estimates an area including an object captured.

The object-price estimation unit 102 extracts the estimated area from the entire scene image and generates a small image, and estimates the price of the object captured in the small image. The object-price estimation unit 102 outputs information regarding the estimated price to the action planning unit 103. In such a manner, the object-price estimation unit 102 functions as a value estimation unit that estimates the price as the value of the object.

On the basis of the scene image supplied from the scene-image acquisition unit 101 and the estimated price represented by the information supplied from the object-price estimation unit 102, the action planning unit 103 plans various types of actions such as a movement route plan, a plan of a state during moving, and a plan of a manner of holding an object. The action planning unit 103 outputs information regarding such a planned action to the drive control unit 104.

The drive control unit 104 controls each drive unit of the drive unit 33 in accordance with the plan represented by the information supplied from the action planning unit 103, and achieves the action of the robot 1.

Figure 4:
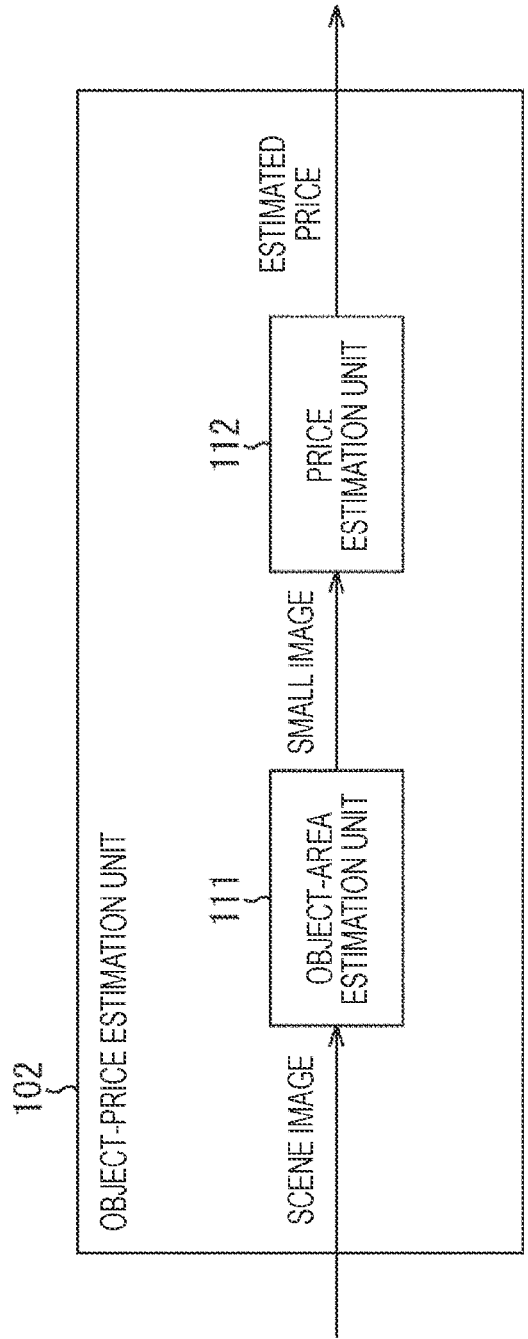
FIG. 4 is a block diagram illustrating an exemplary configuration of an object-price estimation unit.

FIG. 4 is a block diagram illustrating an exemplary configuration of the object-price estimation unit 102.

As illustrated in FIG. 4, the object-price estimation unit 102 includes an object-area estimation unit 111 and a price estimation unit 112.

The object-area estimation unit 111 analyzes the scene image supplied from the scene-image acquisition unit 101 and groups pixels similar in colors and luminance. The object-area estimation unit 111 estimates, for example, a rectangular area surrounding a group of similar pixels as an area including an object captured. The object-area estimation unit 111 extracts the rectangular area estimated as the area including the object captured, from the scene image and generates a small image including the object captured.

Figure 5:
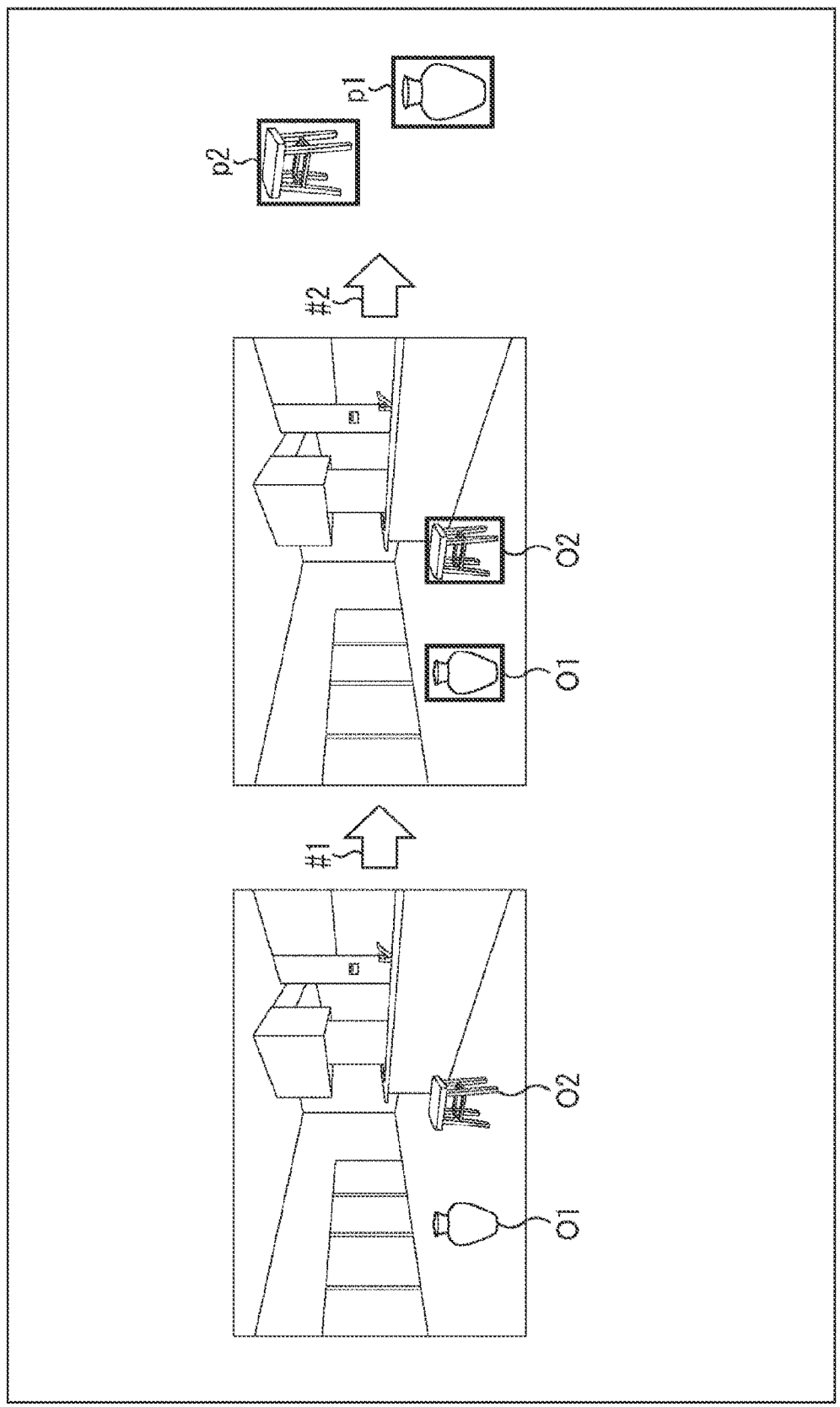
FIG. 5 illustrates exemplary estimation of areas each including an object captured.

FIG. 5 illustrates exemplary estimation of areas each including an object captured.

In a case where the scene image illustrated at the left end of FIG. 5 is input, a rectangular area including a vase O1 captured and a rectangular area including a chair O2 captured are set as illustrated ahead of an arrow #1. Each rectangular area is extracted from the scene image, and a small image p1 including the vase O1 captured and a small image p2 including the chair O2 captured are generated as illustrated ahead of an arrow #2.

In a case where an inferencer that uses such a scene image as an input and outputs a rectangular area surrounding an object is generated in advance by learning, the rectangular area may be set with such an inferencer.

Each small image generated by the object-area estimation unit 111 is supplied to the price estimation unit 112 of FIG. 4.

The price estimation unit 112 estimates the price of the object captured in the small image supplied from the object-area estimation unit 111, and outputs information regarding the estimated price.

Figure 6:
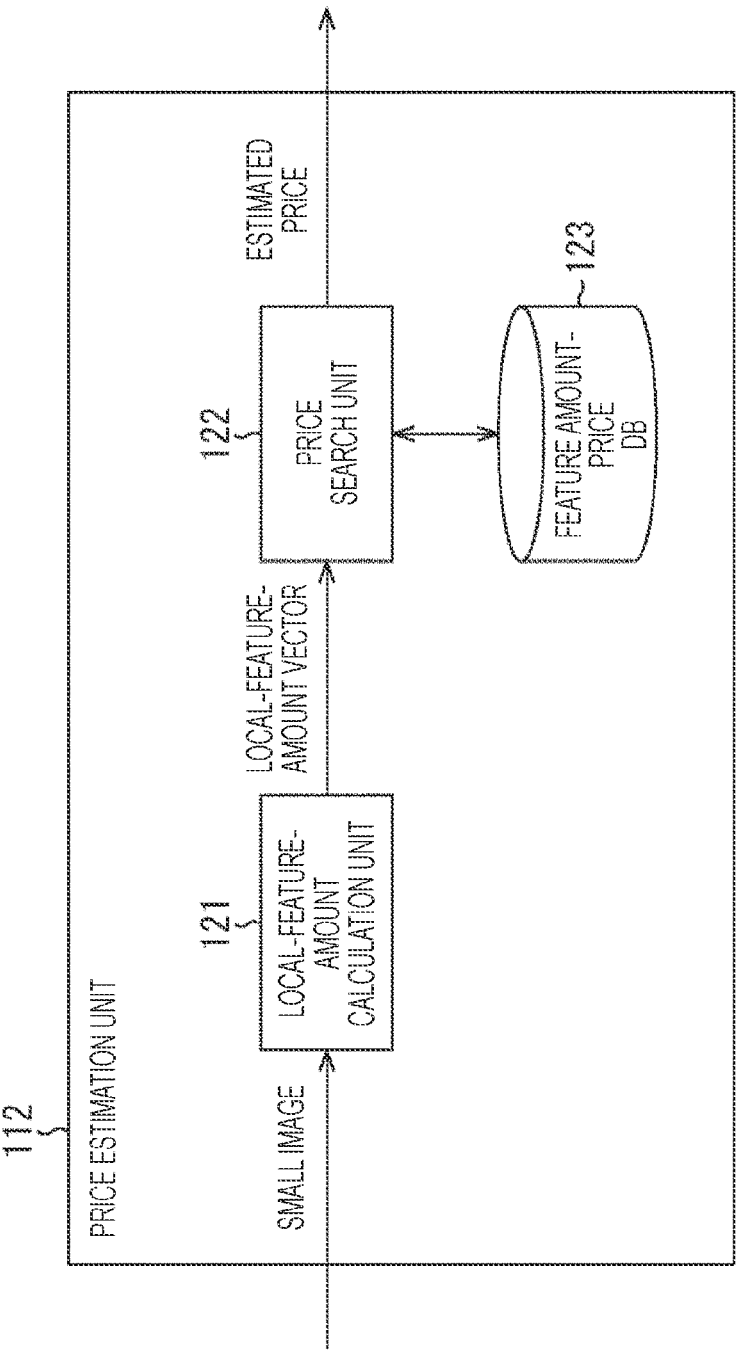
FIG. 6 is a block diagram illustrating an exemplary configuration of a price estimation unit.

FIG. 6 is a block diagram illustrating an exemplary configuration of the price estimation unit 112.

As illustrated in FIG. 6, the price estimation unit 112 includes a local-feature-amount calculation unit 121, a price search unit 122, and a feature amount-price DB 123.

Figure 7:
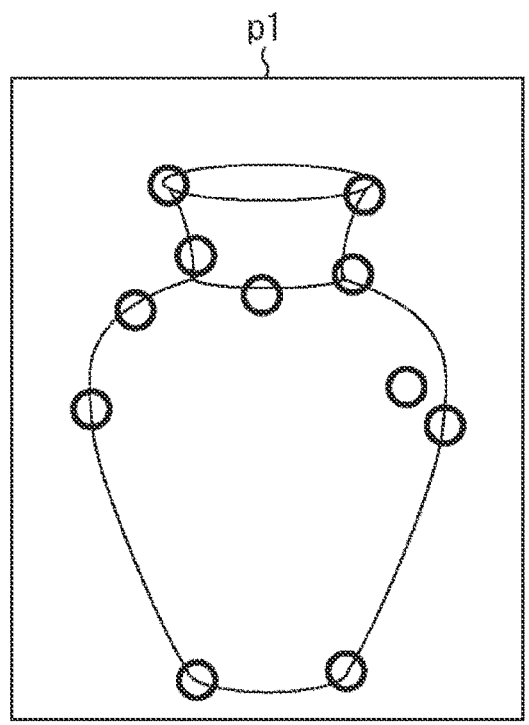
FIG. 7 illustrates an exemplary calculation of local feature amounts.

The local-feature-amount calculation unit 121 analyzes the small image and calculates such a local-feature-amount vector including information regarding the local feature amount of each portion as illustrated in FIG. 7. In the example of FIG. 7, the local-feature amount of each portion of the vase O1 captured in the small image p1 is obtained.

The local-feature-amount calculation unit 121 outputs the local-feature-amount vector to the price search unit 122.

The price search unit 122 searches the feature amount-price DB 123 and acquires the price corresponding to the local-feature-amount vector supplied from the local-feature-amount calculation unit 121. The feature amount-price DB 123 is a database (DB) including information in which the local-feature-amount vector is associated with the price.

The information of the feature amount-price DB 123 is updated by, for example, a system that estimates the price with the local-feature-amount vector as a query. As a system that extracts a local feature amount such as Histogram of Gradient (HoG) and estimates the price corresponding to the local feature amount with a classifiers such as k-neighbor search, Support Vector Machine, or Bug of Words, such a system is prepared in, for example, a predetermined server.

Communication is performed between the robot 1 and a server on the Internet at a predetermined timing, and the information of the feature amount-price DB 123 is updated on the basis of the information transmitted from the server. The system that updates the information of the feature amount-price DB 123 may be provided in the robot 1, and the robot 1 itself may update the information of the feature amount-price DB 123.

Figure 8:
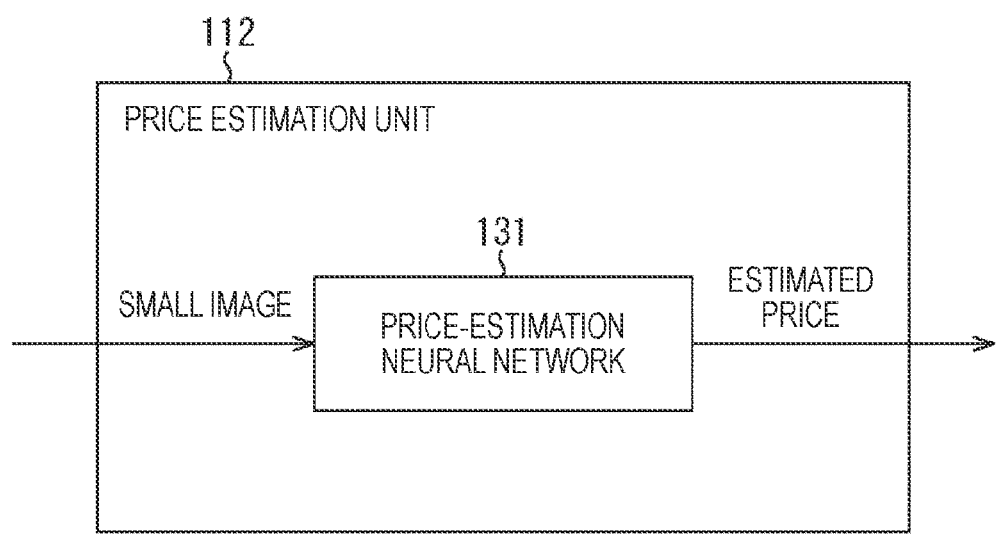
FIG. 8 is a block diagram illustrating another exemplary configuration of the price estimation unit.

FIG. 8 is a block diagram illustrating another exemplary configuration of the price estimation unit 112.

A price estimation unit 112 illustrated in FIG. 8 includes a price-estimation neural network 131. The price-estimation neural network 131 uses a small image as an input and outputs the estimated price of an object captured in the small image.

The price-estimation neural network 131 is an inferencer generated by learning such as so-called deep learning, in which a small image is used as learning data and a price is used as supervised data, for example. The price-estimation neural network 131 may be generated by unsupervised learning. Learning of the price-estimation neural network 131 may be performed in the robot 1 or may be performed by the server on the Internet.

<Movement Route Plan>

As an action plan of a robot 1, an exemplary case of planning a movement route will be described.

Figure 9:
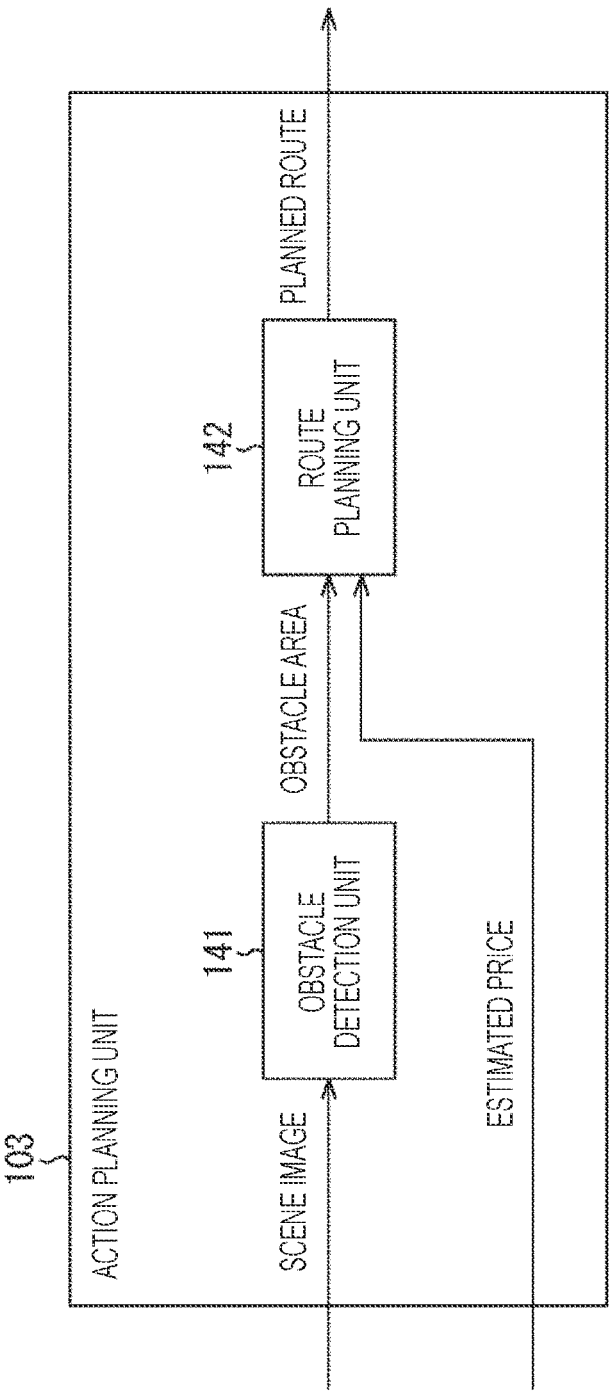
FIG. 9 is a block diagram illustrating an exemplary configuration of an action planning unit.

FIG. 9 is a block diagram illustrating an exemplary configuration of the action planning unit 103.

As illustrated in FIG. 9, the action planning unit 103 includes an obstacle detection unit 141 and a route planning unit 142. The scene image output from the scene-image acquisition unit 101 is input to the obstacle detection unit 141, and the information regarding the estimated price output from the object-price estimation unit 102 is input to the route planning unit 142.

The obstacle detection unit 141 analyzes the scene image and detects a peripheral obstacle. Examples of the obstacle include wall faces of a room, furniture, and an object to be a price estimation target. The obstacle detection unit 141 outputs information representing the position, size, and the like of the obstacle to the route planning unit 142.

The route planning unit 142 plans a movement route from the position of the robot 1 to the destination on the basis of the obstacle detected by the obstacle detection unit 141 and the price of each object estimated by the object-price estimation unit 102.

Figure 10:
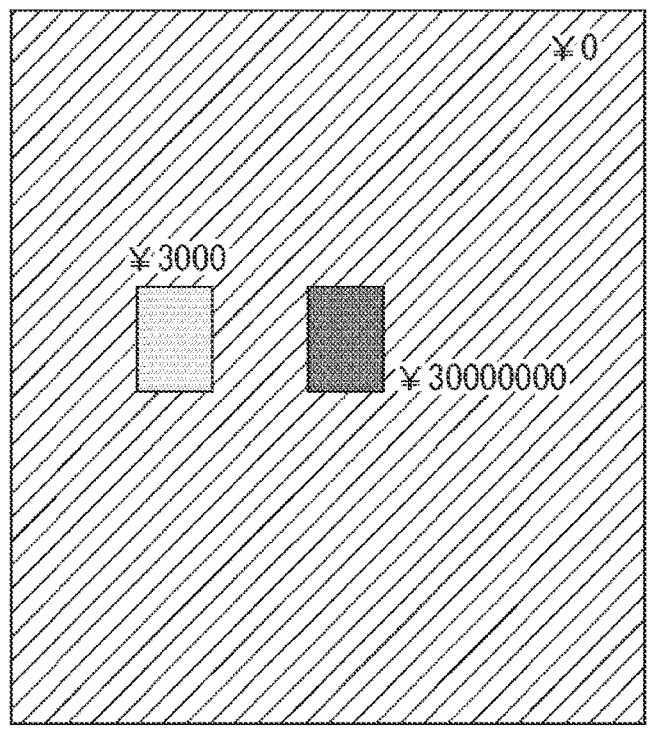
FIG. 10 illustrates an exemplary price map.

The price of each object estimated by the object-price estimation unit 102 may be represented by such a price map as illustrated in FIG. 10. The price map is information generated by mapping the price to an area corresponding to the position of each object.

In the price map of FIG. 10, the shaded area is an area where an object having a price equal to or higher than a predetermined price is not placed. On the other hand, the vertically-long rectangular area on the left side indicated in light color is an area where an object having a price of 3000 yen is placed, and the vertically-long rectangular area on the right side indicated in dark color is an area where an object having a price of 3000000 yen is placed.

Such a price map is generated by the object-price estimation unit 102 and input to the route planning unit 142 as information regarding the estimated price.

Referring back to the description of FIG. 9, the movement route to the destination is planned, for example, by setting an initial route such as the shortest route for heading to the destination while avoiding an obstacle and modifying the initial route on the basis of the price of an object placed along the route. The modification of the initial route is performed such that a distance corresponding to the price of the object is ensured, for example.

Figure 11A:
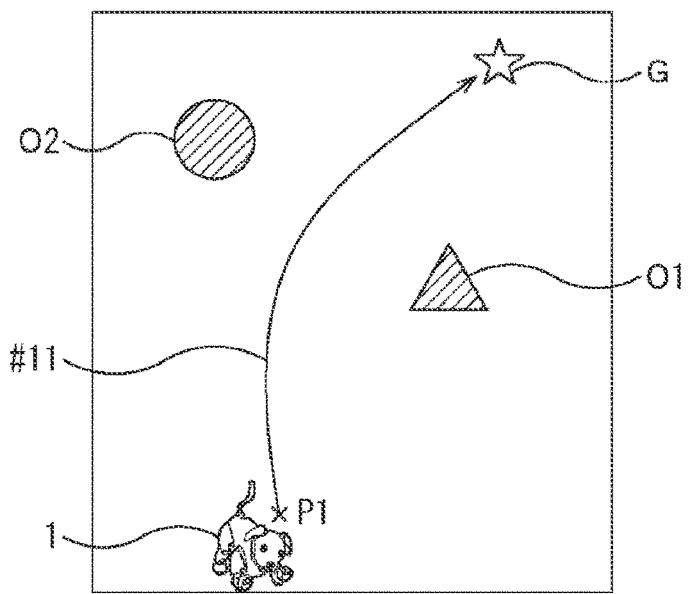
FIGS. 11A and 11B illustrate an exemplary movement route plan.
Figure 11B:
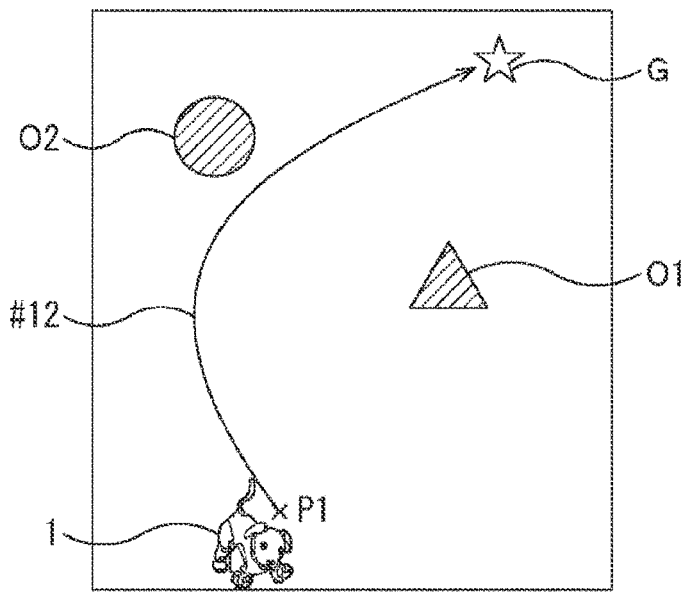

FIGS. 11A and 11B illustrate an exemplary movement route plan.

The ranges of the rectangular areas illustrated in FIGS. 11A and 11B each correspond to part of the room in which the robot 1 is present. The position of the vase O1 placed in the room is represented by a diagonal triangle, and the position of the chair O2 is represented by a diagonal circle.

A route #11 illustrated in FIG. 11A is the initial route from the position P1 of the robot 1 to the destination G. For example, the shortest route for heading to the destination while avoiding an obstacle without considering the value of each object is set as the route #11.

In order to move to the destination G, the robot 1 will pass between the vase O1 and the chair O2. In a case where the value of each object is not considered, the initial route is set such that the robot 1 passes the position intermediate between the vase O1 and the chair O2.

A route #12 illustrated in FIG. 11B is a movement route to the destination G, which is planned in consideration of the value of each object. The route #11 is modified on the basis of the respective prices of the vase O1 and the chair O2. As illustrated in FIG. 11B, the route is planned such that the distance to the vase O1 having a higher price is maximized and the robot 1 passes near the chair O2.

The movement route may be planned by weighting in accordance with the price of the vase O1 and the price of the chair O2. For example, in a case where the price of vase O1 is 10 times the price of chair O2, a movement route is planned such that the distance between the robot 1 and the vase O1 (the coordinates of the robot 1 and the coordinates of an edge of the vase O1) is always the distance 10 times the distance between the robot 1 and the chair O2 (the coordinates of the robot 1 and the coordinates of an edge of the chair O2).

The route planning unit 142 of FIG. 9 outputs information regarding the movement route planned as above. The drive control unit 104 performs control such that the robot 1 moves in accordance with the movement route planned by the route planning unit 142.

Here, the processing by the robot 1 that plans such a movement route will be described with reference to the flowchart of FIG. 12.

In step S1, the scene-image acquisition unit 101 acquires a scene image shot by the camera 41.

In step S2, the object-area estimation unit 111 extracts each rectangular area including an object captured, from the scene image and generates a small image.

In step S3, the price estimation unit 112 estimates the price of each object captured in all the small images generated by the object-area estimation unit 111.

In step S4, the price estimation unit 112 generates a price map on the basis of the estimated price of each object.

In step S5, the route planning unit 142 plans a movement route to the destination as described above on the basis of the price map, and ends the processing. The position of an obstacle detected by the obstacle detection unit 141 is also appropriately considered for the movement route plan.

With the above processing, the robot 1 can plan a route passing a position away from an expensive object, as a movement route. Furthermore, moving in accordance with such a movement route enables the robot 1 to reduce the possibility of damaging the expensive object.

<Plan Regarding State During Movement>

As an action plan of a robot 1, an exemplary case of planning a state during movement will be described.

Figure 13:
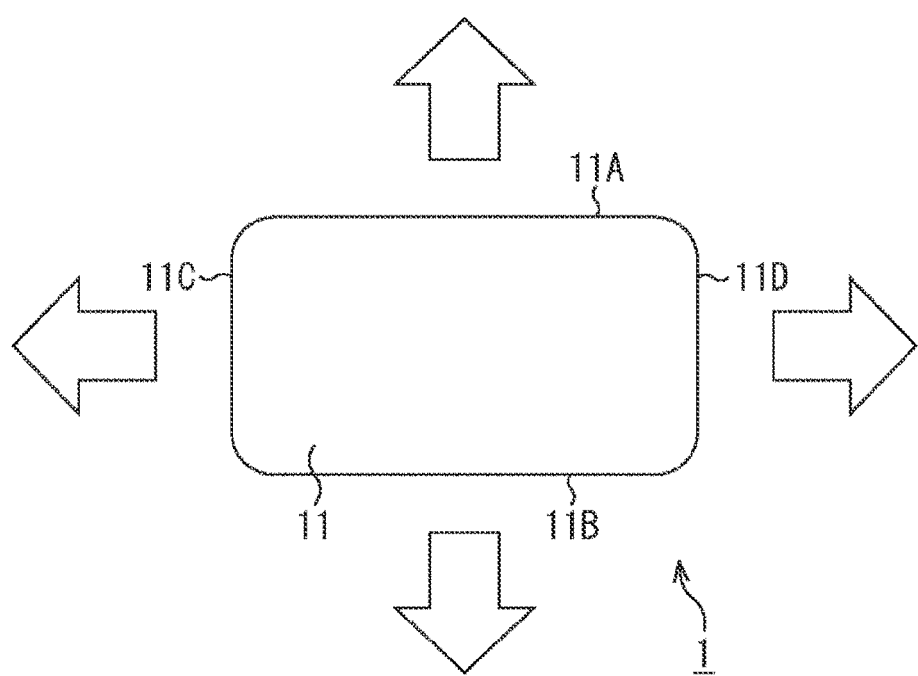
FIG. 13 illustrates an exemplary external appearance of a robot.

FIG. 13 illustrates an exemplary external appearance of the robot 1.

In the example of FIG. 13, the robot 1 has a housing 11 having a horizontally-long rectangular shape with rounded corners in top view. The robot 1 is a movable body movable forward, backward, left, and right as indicated by arrows. The housing 11 has a bottom face (not illustrated) provided with mechanisms for movement such as wheels.

The robot 1 is capable of moving in a posture with the front face 11A and the back face 11B facing in the directions of movement as indicated by the arrows in the up-and-down direction. The robot 1 is also capable of moving in a posture with the left-side face 11C and the right-side face 11D facing in the directions of movement as indicated by the arrows in the left-and-right direction.

In the robot 1, a posture during movement and a movement mode are planned on the basis of the price of peripheral objects.

•Plan of Posture During Movement

In a case where the robot 1 has the housing 11 described with reference to FIG. 13, the width of the housing 11 in the directions of movement differs depending on a posture during movement. The width of the housing 11 during movement in the posture with the front face 11A and the back face 11B facing the directions of movement is wider than the width of the housing 11 during movement in the posture with the left-side face 11C and the right-side face 11D facing the directions of movement.

As a plan of a posture during movement, the robot 1 moves in which posture is planned.

Figure 14A:
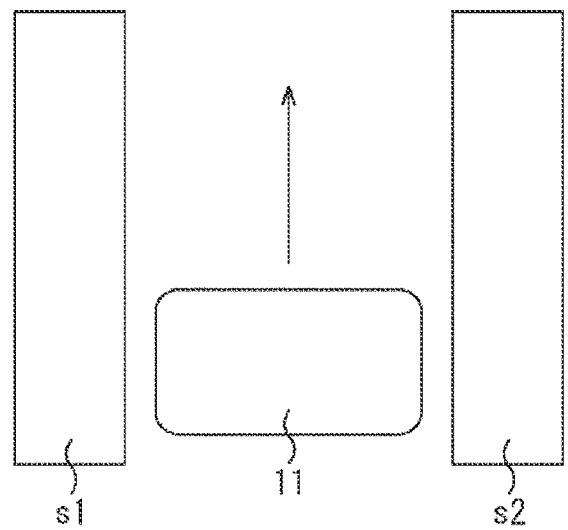
FIGS. 14A and 14B illustrate exemplary postures during movement.
Figure 14B:
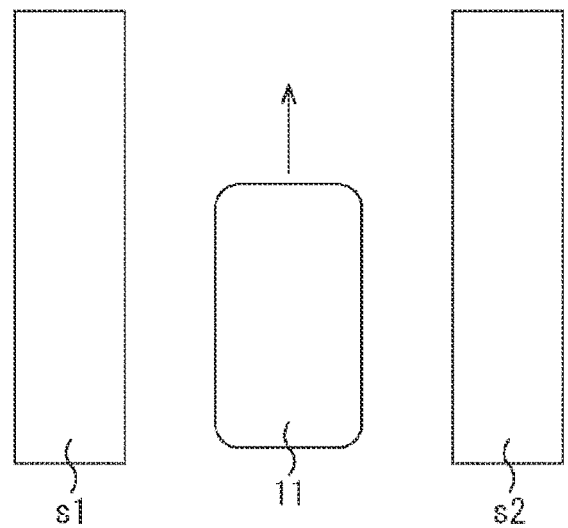

FIGS. 14A and 14B illustrate exemplary postures during movement.

In the examples of FIGS. 14A and 14B, vertically-long rectangular shelves s1 and s2 are placed in parallel in plan view. It is assumed that various types of objects are disposed on the shelves s1 and s2 and the price of each object has been estimated. Furthermore, it is assumed that the movement route of the robot 1 is set as a route passing between the shelves s1 and s2.

FIG. 14A illustrates a posture in a case where the price of the objects disposed on the shelves s1 and s2 is lower than a predetermined price, and FIG. 14B illustrates a posture in a case where the price of the objects is higher than the predetermined price. The price as a threshold for determining a posture is set in advance.

As illustrated in FIG. 14A, in a case where the price of the objects is lower than the predetermined price, the posture with the front face 11A and the back face 11B facing in the directions of movement is planned as the posture during movement.

On the other hand, as illustrated in FIG. 14B, in a case where the price of the objects is higher than the predetermined price, the posture with the left-side face 11C and the right-side face 11D facing in the directions of movement is planned as the posture during movement.

The posture in FIG. 14B with the left-side face 11C and the right-side face 11D facing in the directions of movement is a posture in which the housing 11 has a narrower width in the left-and-right direction and thus enables maximizing the distance between the shelves s1 and s2, in comparison with the posture in FIG. 14A with the front face 11A and the back face 11B facing in the directions of movement. In other words, the former posture is less likely to hit the shelves s1 and s2 than the latter posture.

As described above, in the robot 1, the posture during movement is switched on the basis of the price of the objects along the movement route. Planning and controlling the posture during movement as above enables reducing the possibility of damaging an expensive object.

FIG. 15 is a block diagram illustrating an exemplary configuration of an action planning unit 103 that plans the state during movement.

The configuration of the action planning unit 103 illustrated in FIG. 15 is different from that of the action planning unit 103 illustrated in FIG. 9 in that a state-during-movement planning unit 151 is provided instead of the route planning unit 142. A scene image output from a scene-image acquisition unit 101 is input to an obstacle detection unit 141, and information regarding an estimated price output from an object-price estimation unit 102 is input to the state-during-movement planning unit 151. Description overlapping with that in FIG. 9 will be omitted appropriately.

The state-during-movement planning unit 151 specifies the price of an object along a movement route on the basis of the information supplied from the object-price estimation unit 102. The state-during-movement planning unit 151 plans such a movement route similarly to the route planning unit 142 of FIG. 9, and compares the price of the object along the movement route with a threshold price to determine the posture when passing between two objects.

Figure 16:
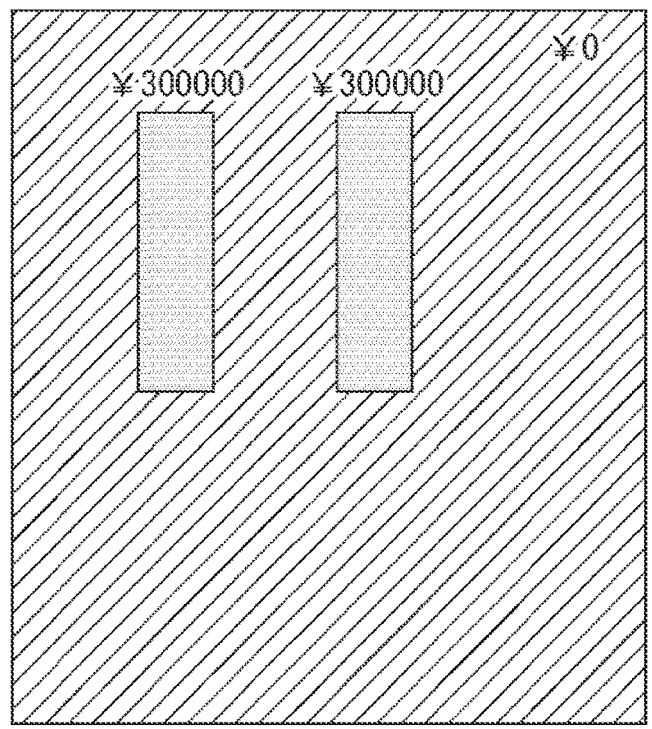
FIG. 16 illustrates an exemplary price map.

FIG. 16 illustrates an exemplary price map including the positions where shelves s1 and shelves s2 are installed.

In the price map of FIG. 16, the areas of shelves s1 and shelves s2 are represented as light-colored areas. The total price of the objects disposed on the shelf s1 is assumed to be 300000 yen higher than the threshold price. Similarly, the total price of the objects disposed on the shelf s2 is also assumed to be 300000 yen higher than the threshold price. The estimated price of each object estimated by the object-price estimation unit 102 may be represented by such a price map as illustrated in FIG. 16.

Referring back to the description of FIG. 15, in the case of determining the posture for passing between the two objects, the state-during-movement planning unit 151 outputs information regarding the state during movement including the posture during movement. The information output from the state-during-movement planning unit 151 also includes information regarding the movement route. A drive control unit 104 performs control such that a robot 1 moves in the posture planned by the state-during-movement planning unit 151.

Here, the processing by the robot 1 that plans such a posture during movement will be described with reference to the flowchart of FIG. 17.

Figure 12:
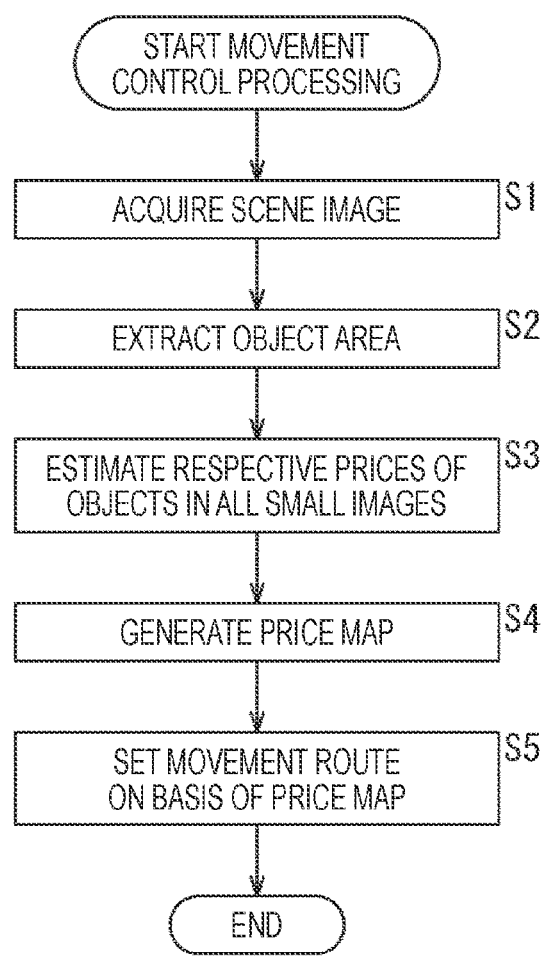
FIG. 12 is a flowchart for explaining processing by a robot that plans a movement route.
Figure 17:
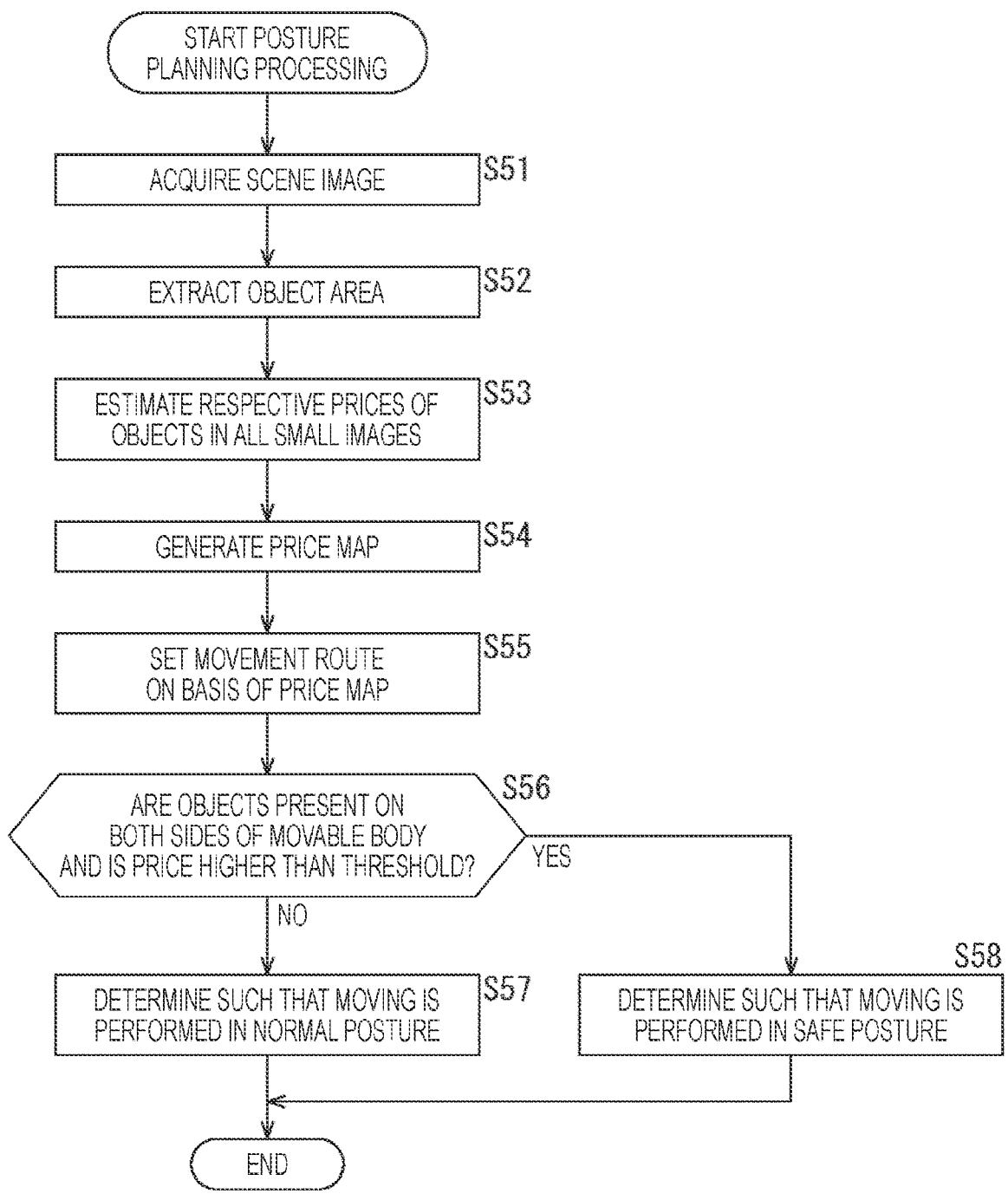
FIG. 17 is a flowchart for explaining process by a robot that plans a posture during movement.

The processing of steps S51 to S55 of FIG. 17 is similar to that of steps S1 to S5 of FIG. 12. Overlapping description will be omitted appropriately.

That is, a small image is generated by extracting an area including an object captured, from a scene image, and the price of each object captured in the small image is estimated. A price map as described with reference to FIG. 16 is generated on the basis of the estimated price, and a movement route is set on the basis of the price map.

In step S56, the state-during-movement planning unit 151 determines whether or not objects are present on both sides of the movable body and the price of the objects present on both sides thereof is higher than the threshold.

In a case where it is determined in step S56 that the price of the objects on both sides of the movable body is lower than the threshold, in step S57, the state-during-movement planning unit 151 determines such that moving is performed in a normal posture. The normal posture referred to here is such a posture with the front face 11A and the back face 11B facing in the directions of movement as described with reference to FIG. 14A.

On the other hand, in a case where it is determined in step S56 that the price of the objects on both sides of the movable body is higher than the threshold, in step S58, the state-during-movement planning unit 151 determines such that moving is performed in a safe posture. The safe posture referred to here is such a posture with the left-side face 11C and the right-side face 11D facing in the directions of movement as described with reference to FIG. 14B.

After the posture is determined in step S57 or step S58, the processing ends. The posture during movement of the robot 1 is controlled in accordance with the plan including the posture determined as above.

Plan of Movement Mode

Figure 18A:
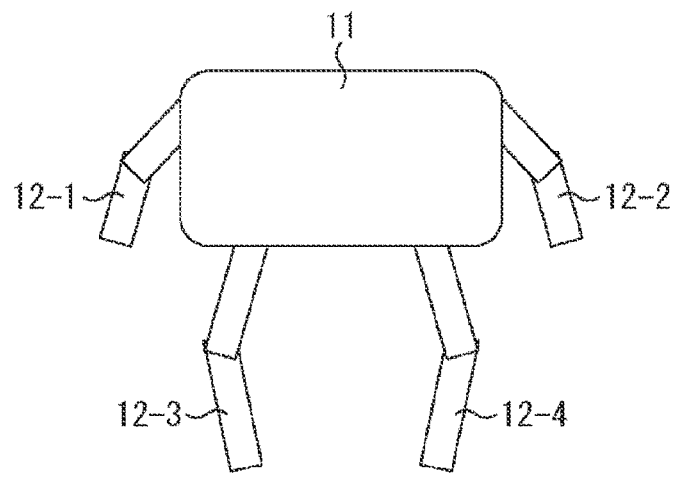
FIGS. 18A and 18B illustrate an exemplary movement mode of the robot.
Figure 18B:
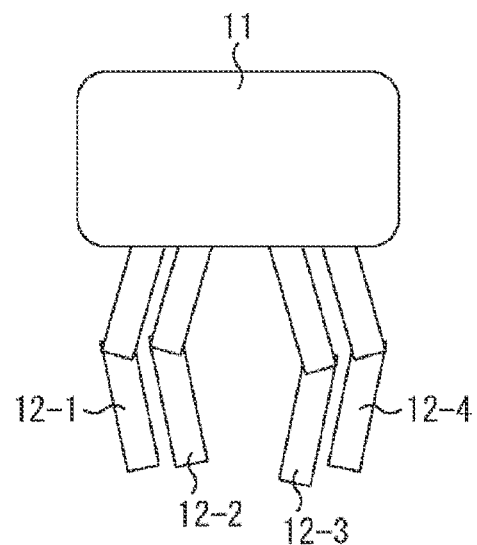

FIGS. 18A and 18B illustrate an exemplary movement mode of a robot 1.

In the examples of FIGS. 18A and 18B, the robot 1 has a housing 11 provided with four arms of arms 12-1 to 12-4.

For example, moving the portion connecting the arm 12-1 with the housing 11 and the portion connecting the arm 12-2 with the housing 11 allows the arm 12-1 and the arm 12-2 to extend one-to-one from the side faces of the housing 11, or extend from the bottom face thereof. The arm 12-3 and the arm 12-4 are provided extending from the bottom face of the housing 11.

FIG. 18A illustrates a movement mode in a case where the price of objects is lower than a predetermined price, and FIG. 18B illustrates a movement mode in a case where the price of the objects is higher than the predetermined price. The price as a threshold for determining a movement mode is set in advance.

As illustrated in FIG. 18A, in a case where the price of peripheral objects is lower than the predetermined price, a mode of movement in bipedal walking with the arm 12-3 and arm 12-4 is planned as the movement mode.

In the example of FIG. 18A, the arm 12-1 and the arm 12-2 extend one-to-one from the side faces of the housing 11, and the two arms of the arm 12-3 and arm 12-4 are used as moving mechanisms.

On the other hand, as illustrated in FIG. 18B, in a case where the price of the peripheral objects is higher than the predetermined price, a mode of movement in quadrupedal walking with the arms 12-1 to 12-4 is planned as the movement mode.

In the example of FIG. 18B, the arm 12-1 and the arm 12-2 extend from the bottom face of the housing 11, and the four arms of the arms 12-1 to 12-4 are used as moving mechanisms.

In such a manner, in the transformable robot 1, the state-during-movement planning unit 151 switches, on the basis of the price of peripheral objects, the number of moving mechanisms to be used for movement and plans a movement mode. For example, although the bipedal-walking movement mode illustrated in FIG. 18A is less stable than the quadrupedal-walking movement mode illustrated in FIG. 18B, the bipedal-walking movement mode enables movement at a higher speed.

In the case of moving near an object having a higher price, moving in the quadrupedal-walking movement mode is planned with priority given to its stability. Thus, this planning enables reducing the possibility of damaging the expensive object.

In addition, in the case of moving near an object having a lower price, moving in the bipedal-walking movement mode is planned with priority given to its speed. Thus, this planning enables moving more quickly.

There has been described the case where the arms are each used as a mechanism for movement and the movement mode is controlled by switching the number of arms. However, in a case where tires are each used as a moving mechanism, the movement mode may be controlled by switching the number of tires. For example, in the case of moving near an object having a lower price, a two-wheel movement mode is selected, and in the case of moving near an object having a higher price, a four-wheel movement mode is selected.

The type itself of a mechanism to be used for movement may be switched such that in the case of moving near an object having a lower price, a movement mode with arms or tires is selected and such that in the case of moving near an object having a higher price, a movement mode of flying over the object is selected.

As a state during movement, a state different from the posture and the movement mode may be planned on the basis of the price of an object.

For example, it is possible that the moving speed of the robot 1 is planned on the basis of the price of peripheral objects, for example, such that the moving speed is set at a low speed in the case of passing near an object having a higher price and the moving speed is set at a high speed in the case of passing near an object having a lower price.

As above, automatic switching may be made between a mode with priority given to protection of an object and a mode with priority given to movement at the shortest distance or movement at the highest speed. Furthermore, the user may be able to select a mode to be prioritized.

<Plan of Holding Manner>

As an action plan of a robot 1, an exemplary case of planning a manner of holding an object will be described.

Figure 19:
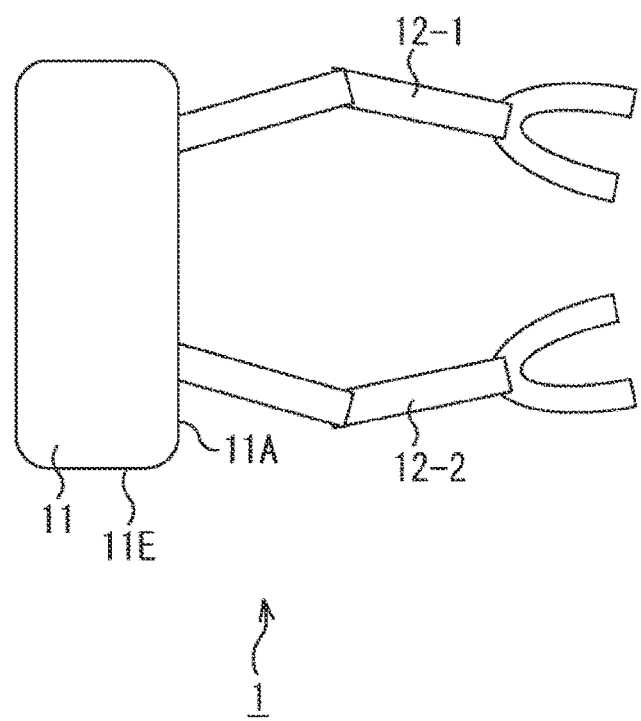
FIG. 19 illustrates an exemplary external appearance of a robot having object-holding mechanisms.

FIG. 19 illustrates an exemplary external appearance of the robot 1 having object-holding mechanisms.

In the example of FIG. 19, the robot 1 has a housing 11 having a vertically-long rectangular shape with rounded corners in side view. The housing 11 has a front face 11A provided with two arms 12-1 and 12-2 serving as object-holding mechanisms. Furthermore, the housing 11 has a bottom face 11E provided with moving mechanisms such as wheels.

The robot 1 of FIG. 19 is a movable body having a carrying function capable of holding an object or the like placed in a room by driving the arms 12-1 and 12-2 and carrying the object in that state to a predetermined position.

In such a robot 1, a manner of holding an object such as a holding mode and a manner of placing an object being held is planned on the basis of the price of an object to be held.

•Plan of Holding Mode The object-holding mode includes a mode of holding one object with one arm and a mode of holding one object with two arms, for example.

As a plan of the holding mode, it is planned that a target object is to be held in which of the plurality of modes different in the number of mechanisms to be used for holding one object.

Figure 20A:
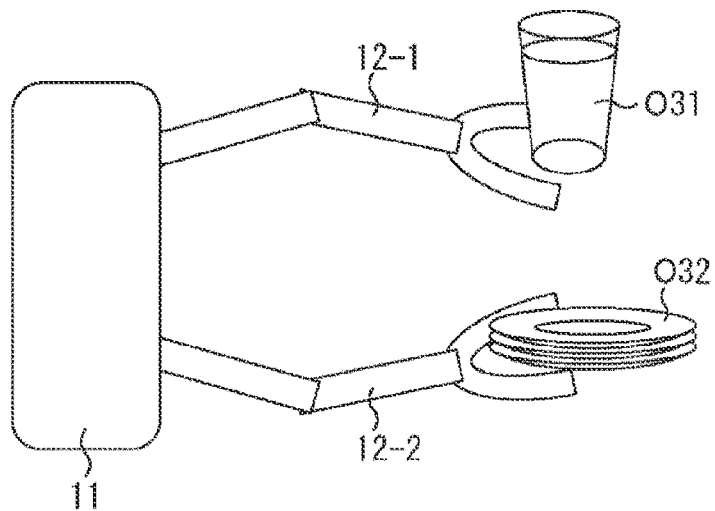
FIGS. 20A and 20B illustrate an exemplary object-holding mode.
Figure 20B:
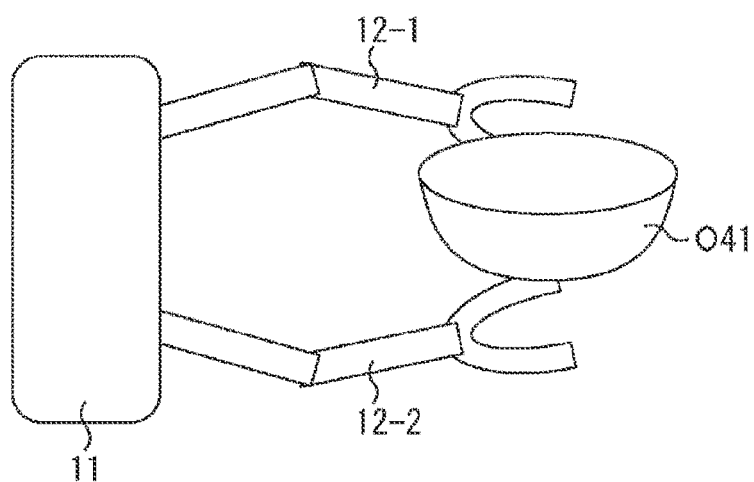

FIGS. 20A and 20B illustrate an exemplary object-holding mode.

FIG. 20A illustrates a holding mode in a case where the price of an object is lower than a predetermined price, and FIG. 20B illustrates a holding mode in a case where the price of an object is higher than the predetermined price. The price as a threshold for determining a holding mode is set in advance.

As illustrated in FIG. 20A, in a case where the price of an object is lower than the predetermined price, the mode of holding one object with one arm is planned as the holding mode.

In the example of FIG. 20A, a glass O31 is held with the arm 12-1, and a dish O32 is held with the arm 12-2. Each of the glass O31 and the dish O32 is an object of which estimated price is lower than the price set as the threshold.

On the other hand, as illustrated in FIG. 20B, in a case where the price of the object is higher than the predetermined price, the mode of holding one object with two arms is planned as the holding mode.

In the example of FIG. 20B, a vessel O41 is held with the arm 12-1 and the arm 12-2. The vessel O41 is an object of which estimated price is higher than the price set as the threshold.

As described above, in the robot 1, a holding mode is planned by switching the number of mechanisms to be used for holding, on the basis of the price of an object to be held.

It is considered that the larger the number of mechanisms to be used for holding is, the safer an object can be held. Holding an expensive object with many mechanisms enables the robot 1 to reduce the possibility of damaging the expensive object.

FIG. 21 is a block diagram illustrating an exemplary configuration of an action planning unit 103 that plans a holding manner.

As illustrated in FIG. 21, the action planning unit 103 includes a holding-area estimation unit 161 and a holding planning unit 162. A scene image output from a scene-image acquisition unit 101 is input to the holding-area estimation unit 161, and information regarding an estimated price output from an object-price estimation unit 102 is input to the holding planning unit 162.

The holding-area estimation unit 161 analyzes the scene image and detects a holding area including an object to be held captured. The holding-area estimation unit 161 outputs information representing the position, size, and the like of the object to be held to the holding planning unit 162.

The holding planning unit 162 specifies the price of the object to be held, on the basis of the information supplied from the object-price estimation unit 102.

Figure 22:
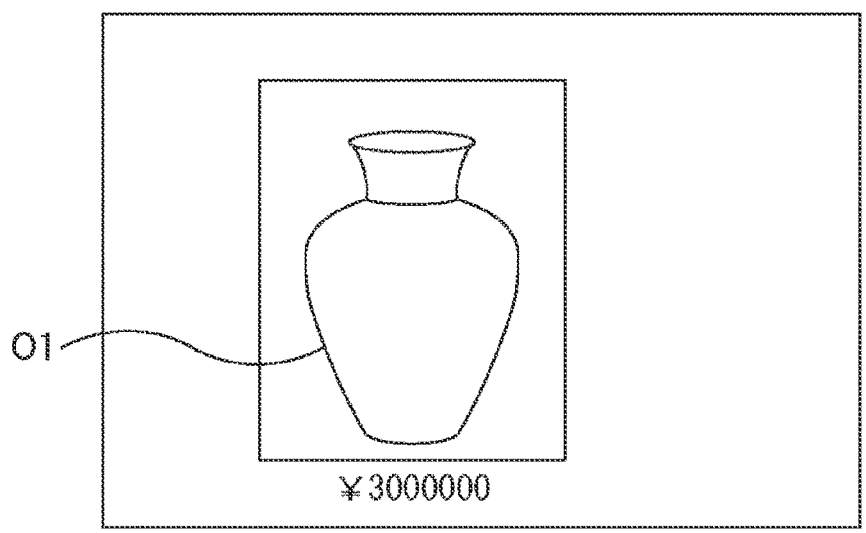
FIG. 22 illustrates an exemplary object to be held.

FIG. 22 illustrates an exemplary object to be held.

In the example of FIG. 22, the area indicated by surrounding with the vertically-long rectangular frame has been detected by the holding-area estimation unit 161, as a holding area including a vase O1 that is an object to be held captured. In addition, it has been specified that the price of the vase O1 is 3000000 yen on the basis of the information supplied from the object-price estimation unit 102.

After specifying the price of the object to be held, the holding planning unit 162 plans a holding mode on the basis of the price of the object to be held.

The holding planning unit 162 outputs a holding plan including information regarding the holding manner, including information for designating the holding position of the object to be held by each arm, information for designating a movement route to the transport destination, and the like. A drive control unit 104 performs, for example, control such that arms 12-1 and 12-2 drive in accordance with the holding mode planned by the holding planning unit 162.

Figure 23:
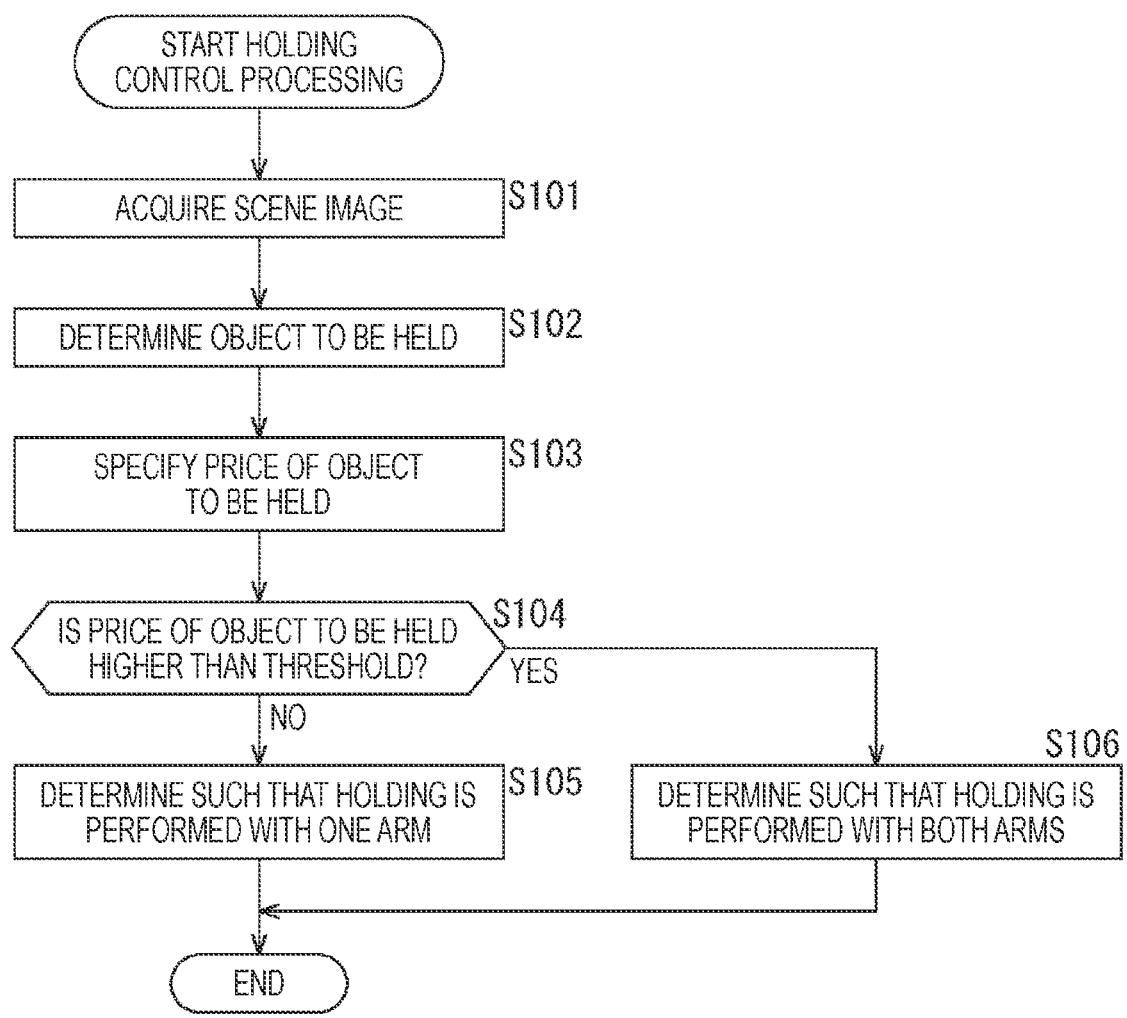
FIG. 23 is a flowchart for explaining processing by a robot that plans the holding mode.

Here, the processing by the robot 1 that plans such a holding mode will be described with reference to the flowchart of FIG. 23.

In step S101, the scene-image acquisition unit 101 acquires as a scene image shot by the camera 41.

In step S102, the holding-area estimation unit 161 analyzes the scene image, determines an object to be held, and detects an area including the object to be held captured.

In step S103, on the basis of the price of each object estimated by the object-price estimation unit 102, the holding planning unit 162 specifies the price of the object to be held. In the object-price estimation unit 102, the price of each peripheral object is estimated and information regarding the estimated price is supplied to the holding planning unit 162.

In step S104, the holding planning unit 162 determines whether or not the price of the object to be held is higher than the threshold.

In a case where it is determined in step S104 that the price of the object to be held is lower than the threshold, in step S105, the holding planning unit 162 determines such that holding is performed with one arm. That is, as described with reference to FIG. 20A, the mode of holding one object with one arm is planned as the holding mode.

On the other hand, in a case where it is determined in step S104 that the price of the object to be held is higher than the threshold, in step S106, the holding planning unit 162 determines such that holding is performed with both arms. That is, as described with reference to 20B, the mode of holding one object with two arms is planned as the holding mode.

After the number of mechanisms to be used for holding the object is determined in step S105 or step S106, the processing ends. The holding manner of the robot 1 is controlled in accordance with the plan including the holding mode determined as above.

Figure 24:
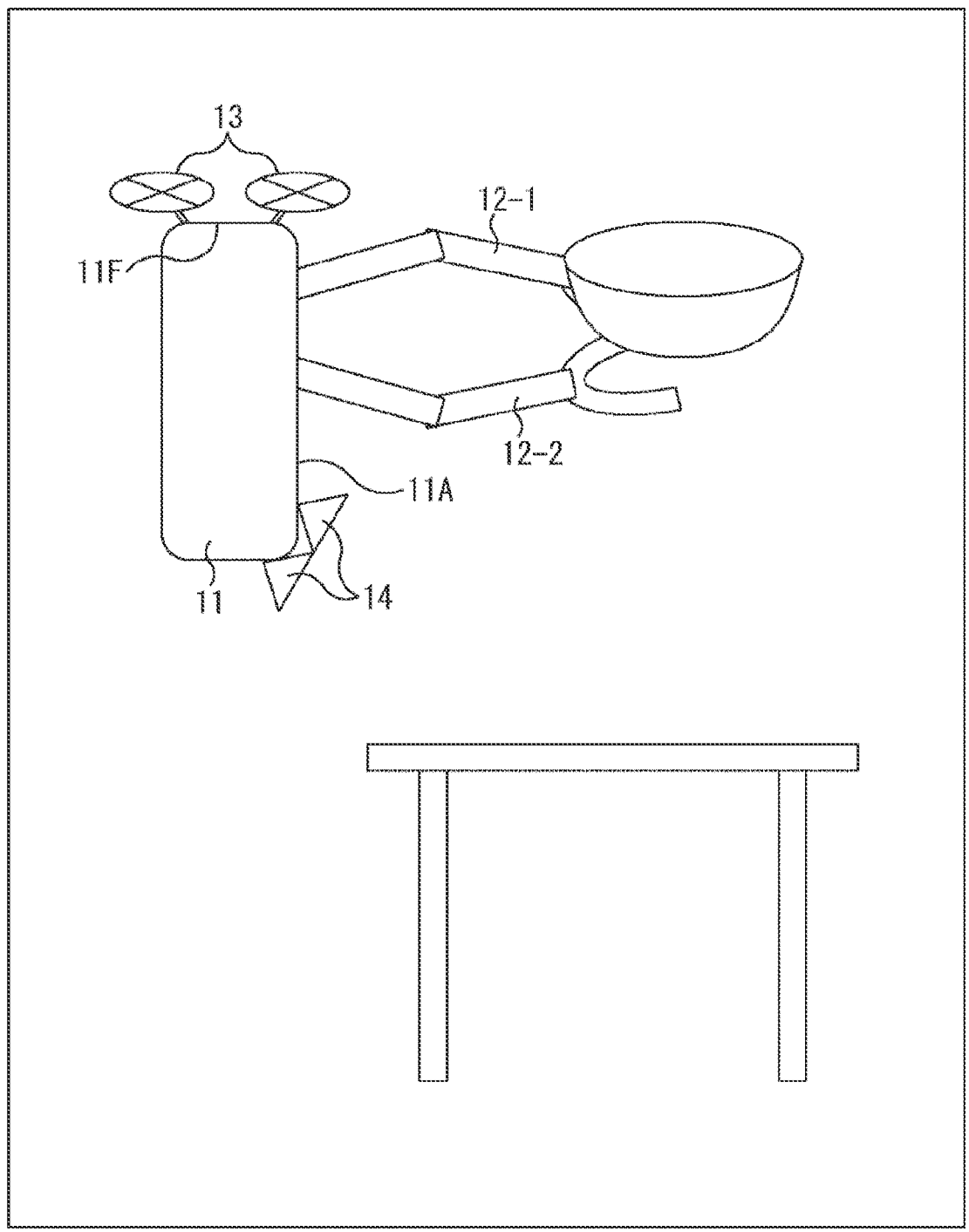
FIG. 24 illustrates another exemplary external appearance of a robot having object-holding mechanisms.

•Plan of Manner of Placing Object Being Held FIG. 24 illustrates another exemplary external appearance of the robot 1 having object-holding mechanisms.

In the example of FIG. 24, a housing 11 has an upper face 11F provided with a propeller 13 for causing a robot 1 to fly. That is, the robot 1 illustrated in FIG. 24 is a drone capable of flying while holding an object.

Furthermore, a depth sensor 14 including a stereo camera, a time of flight (ToF) sensor, and the like is provided below the front face 11A of the housing. The depth sensor 14 measures the height of each position of a placement face and calculates the flatness (horizontality). In the example of FIG. 24, the flatness of each position on the top plate of a table, which is the placement face for an object being held, is calculated.

In such a robot 1, a placement position for the object being held is planned on the basis of the flatness of each position of the placement face and the price of the object being held.

For example, in a case where the price of the object being held is lower than a threshold price, it can be determined as the placement position for the object even if the flatness is lower than a threshold (position oblique to the horizontal plane).

On the other hand, in a case where the price of the object is higher than a predetermined price, it can be determined, of the entire top plate of the table, only the position where the flatness is higher than the threshold (position where part of the top plate close to the horizontal state), as the placement position for the object.

In such a manner, in the robot 1, the placement position is planned by the holding planning unit 162 on the basis of the price of the object being held, and the operation of placing the object is controlled.

In a case where an object having a higher price is placed, a position having a higher flatness is set as the placement position, in comparison with a case where an object having a lower price is placed. Thus, this setting enables reducing the possibility of damaging the expensive object. Such a position having a higher flatness is less likely to slip off in comparison with an oblique position, and thus it can be said to be a safe position.

Figure 25:
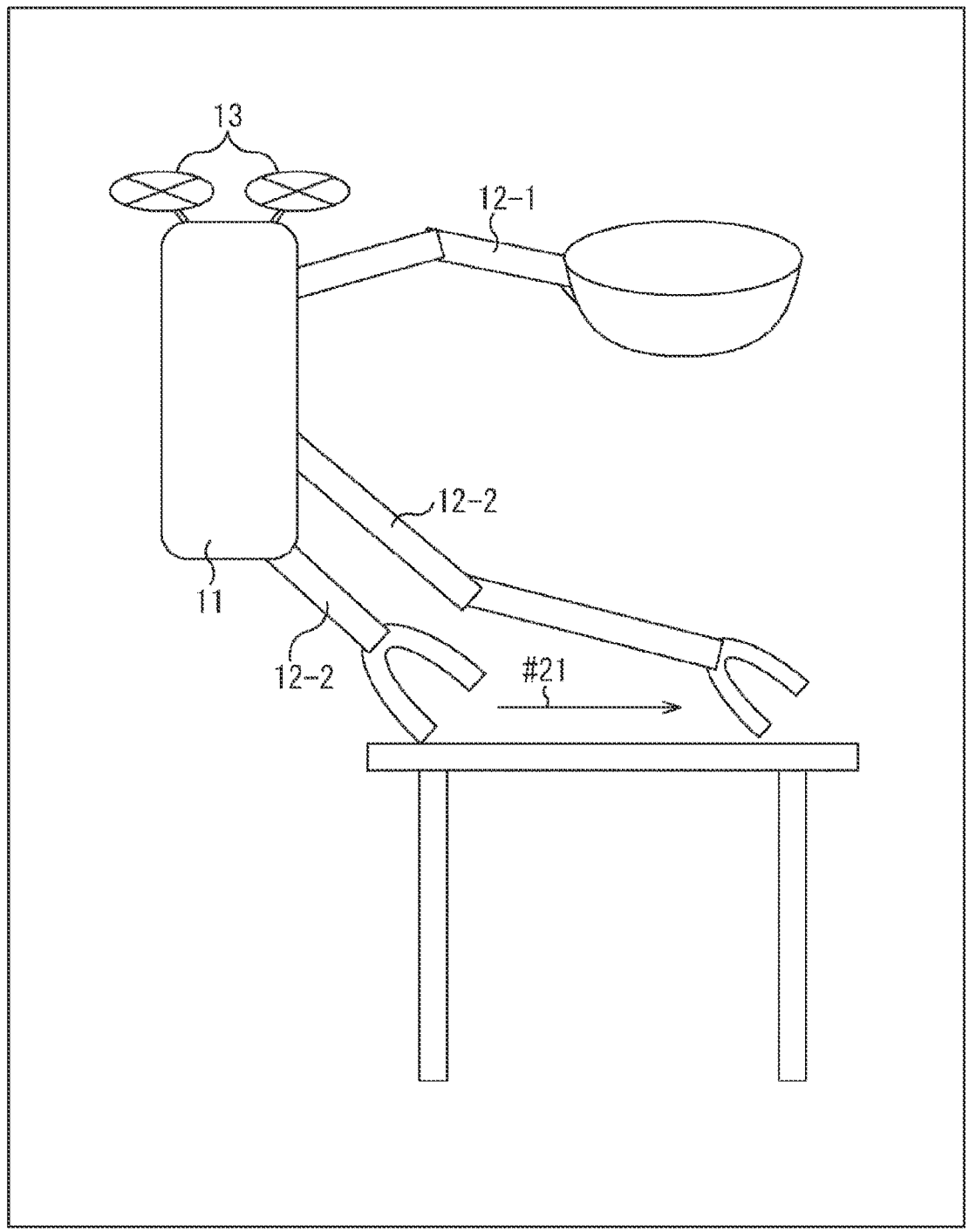
FIG. 25 illustrates an exemplary measurement of flatness.

FIG. 25 illustrates an exemplary measurement of the flatness.

In FIG. 25, the arm 12-2 as one arm of the arms is used as a manipulator, and the leading end of the arm 12-2 comes into contact with the top plate such that the height of each position of the top plate is measured.

Figure 26:
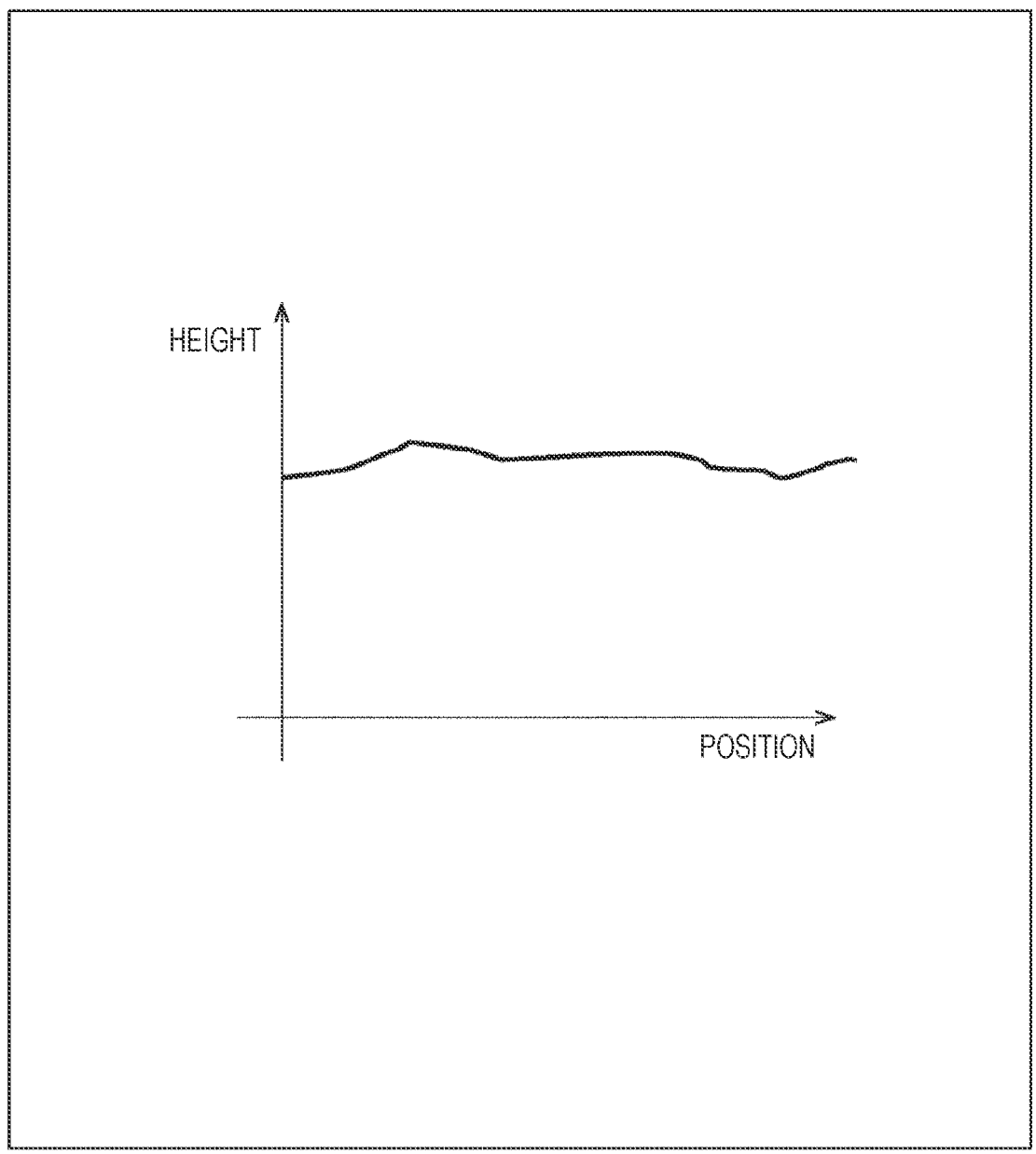
FIG. 26 illustrates an exemplary measurement result of the flatness.

Moving the arm 12-2 as indicated by an arrow #21 with the leading end in contact with the top plate of the table results in obtaining such a measurement result as indicated in FIG. 26. The horizontal axis of FIG. 26 represents the position on the top plate of the table, and the vertical axis represents the height from the ground surface.

In the robot 1, for example, the difference between the height of a reference position and the heights of a plurality of positions around the reference position is calculated from such a measurement result as indicated in FIG. 26, and the flatness is calculated on the basis of the difference in height. In such a manner, various methods can be adopted as a manner of measuring the flatness.

Instead of the flatness, the level of unevenness, the level of slipperiness, the height, the color, and the like of the flat face may be measured, and the placement position may be planned.

For example, when considering the height for the placement position, for an object having a price higher than the threshold price, only the position lower than a threshold height can be determined as the placement position for the object being held.

In addition, when considering the color of a placement face for the placement position, for an object having a price higher than the threshold price, only the position in, for example, white or yellow where the object is distinctive when the object is placed can be determined as the placement position for the object. The placement position may also be determined in consideration of the color of an object itself being held.

For an object having a price lower than the threshold price, even an edge position of the table may be determined as the placement position, and for an object having a price higher than the threshold price, only the position near the center of the table can be determined as the placement position.

The speed of the placement operation by the robot 1 may be planned on the basis of the price of an object such that the speed of the placement operation is set at a slow speed, in the case of placing an object having a higher price, and such that the speed of the placement operation is set at a high speed in the case of placing an object having a lower price.

As above, in the robot 1, an action is planned in order to keep away from an expensive object, move in a state where it is less likely to hit an expensive object, or hold an expensive object more safely. An expensive object will be handled carefully, as it is called.

<Modifications>

An action of a robot 1 may be planned by an external device on the basis of the price of objects at the periphery of the robot 1.

Figure 27:
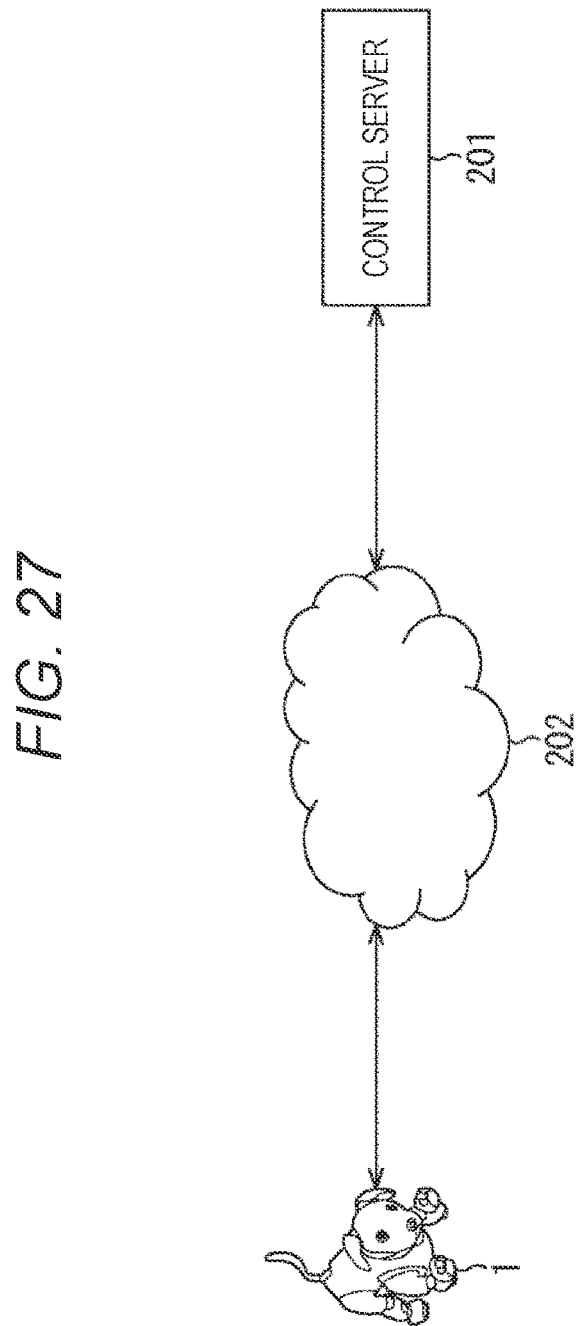
FIG. 27 illustrates an exemplary configuration of a control system.

FIG. 27 illustrates an exemplary configuration of a control system.

The control system of FIG. 27 includes the robot 1, a control server 201, and a network 202 such as the Internet. The robot 1 and the control server 201 are connected via the network 202. The robot 1 and the control server 201 communicate with each other via the network 202.

In the control system of FIG. 27, an action of the robot 1 is planned by the control server 201 that is an external device of the robot 1. Each functional unit of the control unit 31 of FIG. 3 is achieved in the control server 201 by execution of a predetermined program.

A control unit 31 included in the control server 201 plans the action of the robot 1 in such a manner as described above on the basis of data transmitted from the robot 1, and transmits information regarding the planned action to the robot 1. Various types of data such as data of a shot image are repeatedly transmitted from the robot 1 to the control server 201.

The robot 1 will take an action corresponding to the value of each peripheral object as described above in accordance with the plan represented by the information transmitted from the control server 201. In such a manner, the control server 201 functions as a control device that plans and controls an action of the robot 1.

In the above, the price of each object is estimated on the basis of a shot image shot by the camera of the robot 1. The price of each object, however, may be estimated on the basis of sensor data different from the shot image. The value of each object can be estimated on the basis of various types of sensor data such as a distance to the object measured by a distance sensor and the temperature of the object measured by a temperature sensor.

•Exemplary Configuration of Computer The series of processing described above can be performed by hardware or software. In the case of performing the series of processing by the software, programs included in the software are installed from a program recording medium onto a computer embedded in dedicated hardware, a general-purpose personal computer, or the like.

FIG. 28 is a block diagram of an exemplary hardware configuration of a computer that performs the above series of processing in accordance with a program. The control server 201 of FIG. 27 also has a configuration similar to that illustrated in FIG. 28.

A central processing unit (CPU) 1001, a read only memory (ROM) 1002, and a random access memory (RAM) 1003 are mutually connected via a bus 1004.

Moreover, an input-output interface 1005 is connected to the bus 1004. An input unit 1006 including a keyboard, a mouse, and the like and an output unit 1007 including a display, a speaker, and the like are connected to the input-output interface 1005. Furthermore, a storage unit 1008 including a hard disk, a non-volatile memory, and the like;

a communication unit 1009 including a network interface and the like; and a drive 1010 that drives a removable medium 1011 are connected to the input-output interface 1005.

In the computer having the configuration as above, the CPU 1001 loads, for example, a program stored in the storage unit 1008, into the RAM 1003 via the input-output interface 1005 and the bus 1004 to execute the program, so that the series of processing described above is performed.

The program executed by the CPU 1001 having recorded on the removable medium 1011 or the program executed by the CPU 1001 is provided via a wired or wireless transmission medium such as a local area network, the Internet, or a digital broadcast, and then installed in the storage unit 1008, for example.

Note that the program executed by the computer may be a program for chronologically performing the processing in accordance with the order described in the present specification, may be a program for parallelly performing the processing or a program for performing the processing at a required timing, for example, when a call is made.

In the present specification, the system means a collection of a plurality of constituent elements (e.g., devices and modules (parts)), and thus it is not considered whether or not all the constituent elements are included in the same housing. Thus, a plurality of devices housed in separate housings and connected via a network, and one device having a plurality of modules housed in one housing are both systems.

Furthermore, the effects described in the present specification are merely exemplified and are not intended to be limiting, and there may be additional effects.

The embodiments of the present technology are not limited to the above embodiments, and thus various modifications can be made without departing from the gist of the present technology.

For example, the present technology can adopt a cloud computing configuration in which one function is shared and processed by a plurality of devices via a network.

Furthermore, each step described in the above flowcharts can be performed by one device, and can be shared and performed by a plurality of devices.

Moreover, in a case where a plurality of pieces of processing is included in one step, the plurality of pieces of processing included in the one step can be performed by one device, and can be performed by sharing among a plurality of devices.

Examples of Configuration Combination

The present technology can also adopt the following configurations.

(1)
A control device including:
a value estimation unit configured to estimate a value of an object at a periphery of a movable body on the basis of sensor data detected by the movable body; and
an action planning unit configured to plan an action of the movable body on the basis of the value of the object estimated.

(2)
The control device according to (1),
in which the action planning unit plans a movement route to a destination.

(3)
The control device according to (2),
in which the action planning unit plans the movement route in which a distance corresponding to the value of the object is secured.

(4)
The control device according to (3),
in which in the case of passing between two pieces of the objects, the action planning unit plans the movement route passing closer to the object having a lower value than the object having a higher value.

(5)
The control device according to (2), further including:
an obstacle detection unit configured to detect an obstacle on the basis of the sensor data,
in which the action planning unit plans the movement route on the basis of the value of the object and a position of the obstacle.

(6)
The control device according to (1),
in which the action planning unit plans a posture of the movable body during movement of the movable body.

(7)
The control device according to (6),
in which the action planning unit plans, as the posture during the movement, an orientation of a housing of the movable body in a direction of the movement.

(8)
The control device according to (1),
in which the action planning unit plans a movement mode of the movable body.

(9)
The control device according to (8),
in which the action planning unit plans, as the movement mode, a mode different in a number of mechanisms to be used for movement.

(10)
The control device according to (1),
in which the movable body has a mechanism of holding the object, and
the action planning unit plans a holding mode for the object.

(11)
The control device according to (10),
in which the action planning unit plans, as the holding mode for the object, a mode different in a number of the mechanisms to be used for holding the object.

(12)
The control device according to (11),
in which in a case where the object having a higher value is held, the action planning unit plans a mode of using a number of the mechanisms larger than a number of the mechanisms to be used in a case where the object having a lower value is held.

(13)
The control device according to (1),
in which the movable body has a mechanism of holding the object, and
the action planning unit plans a manner of placing the object being held.

(14)
The control device according to (13),
in which the action planning unit plans, as the manner of placing the object, a placement position for the object.

(15)

The control device according to (14), in which in a case where the object having a higher value is placed, the action planning unit plans, as the placement position, a position having a higher flatness, in comparison with a case where the object having a lower value is placed.

(16)

The control device according to any of (1) to (15), further including:

an acquisition unit configured to acquire, as the sensor data, a shot image that is an image shot by a camera provided at the movable body.

(17)

The control device according to (16), further including:

an area estimation unit configured to estimate an area including the object captured, from the shot image, in which the value estimation unit analyzes the estimated area and estimates the value of the object.

(18)

A control method by a control device, including:

estimating a value of an object at a periphery of a movable body on the basis of sensor data detected by the movable body; and planning an action of the movable body on the basis of the value of the object estimated.

(19)

A program for causing a computer to execute processing including:

estimating a value of an object at a periphery of a movable body on the basis of sensor data detected by the movable body; and planning an action of the movable body on the basis of the value of the object estimated.

REFERENCE SIGNS LIST

1 Robot
31 Control unit
32 Input-output unit
33 Drive unit
34 Wireless communication unit
35 Power source unit
101 Scene-image acquisition unit
102 Object-price estimation unit
103 Action planning unit
104 Drive control unit
111 Object-area estimation unit
112 Price estimation unit
121 Local-feature-amount calculation unit
122 Price search unit
123 Feature amount-price DB
131 Price neural network
141 Obstacle detection unit
142 Route planning unit
151 State-during-movement planning unit
161 Holding-area estimation unit
162 Holding planning unit
201 Control server
202 Network

The invention claimed is:

1. A movable body, comprising:
a processor configured to:
analyze a scene image comprising a plurality of objects captured by the movable body;
calculate a local-feature-amount vector of the scene image, wherein the local-feature-amount vector includes information regarding a local feature amount of each portion of each object of the plurality of objects in the scene image;
estimate a value of each object, of the plurality of objects at a periphery of the movable body based on the local-feature-amount vector of the scene image; and
plan an action of the movable body on a basis of the value of each object estimated; and
control movement of the movable body in accordance with the planned action.

2. The movable body according to claim 1, wherein the processor is further configured to plan a movement route to a destination.

3. The movable body according to claim 2, wherein the processor is further configured to plan the movement route in which a distance, between the movable body to each object of the plurality of objects, corresponding to the value of each object of the plurality of objects is secured.

4. The movable body according to claim 3, wherein in a case of passing between two pieces of the plurality of objects, the processor is further configured to plan the movement route to pass closer to the object having a lower value than the object having a higher value.

5. The movable body according to claim 2, wherein the processor is further configured to:
detect an obstacle on a basis of a sensor data detected by the movable body, and
plan the movement route on a basis of the value of each object of the plurality of objects and a position of the obstacle.

6. The movable body according to claim 1, wherein the processor is further configured to plan a posture of the movable body during the movement of the movable body.

7. The movable body according to claim 6, wherein the processor is further configured to plan, as the posture during the movement, an orientation of a housing of the movable body in a direction of the movement.

8. The movable body according to claim 1, wherein the processor is further configured to plan a movement mode of the movable body.

9. The movable body according to claim 8, wherein the processor is further configured to plan, as the movement mode, a mode different in a number of mechanisms to be used for movement.

10. The movable body according to claim 1, wherein the movable body has a mechanism configured to hold an object of the plurality of objects, and the processor is further configured to plan a holding mode for the object.

11. The movable body according to claim 10, wherein the processor is further configured to plan, as the holding mode for the object, a mode different in a number of mechanisms to be used for holding the object, and the number of mechanisms includes the mechanism.

12. The movable body according to claim 11, wherein in a case where the object having a higher value is held, the processor is further configured to hold a mode of using a number of the mechanisms larger than a number of the mechanisms to be used in a case where the object having a lower value is held.

13. The movable body according to claim 1, wherein the movable body has a mechanism configured to hold an object of the plurality of objects, and the processor is further configured to plan a manner of placing the object being held.

14. The movable body according to claim 13, wherein the processor is further configured to plan, as the manner of placing the object, a placement position for the object.

15. The movable body according to claim 14, wherein in a case where the object having a higher value is placed, the processor is further configured to place, as the placement position, a position having a higher flatness, in comparison with an object having a lower value is placed.

16. The movable body according to claim 1,
wherein the processor is further configured to acquire, as a sensor data detected by the movable body, a shot image that is an image shot by a camera provided at the movable body.

17. The movable body according to claim 16, wherein the processor is further configured to:
estimate an area including an object, of the plurality of objects, captured from the shot image, and
analyse the estimated area of the object.

18. A control method, comprising:
analyzing a scene image comprising a plurality of objects captured by a movable body;
calculating a local-feature-amount vector of the scene image, wherein the local-feature-amount vector includes information regarding a local feature amount of each portion of each object of the plurality of objects in the scene image;
estimating a value of each object, of the plurality of objects at a periphery of the movable body based on the local-feature-amount vector of the scene image;
planning an action of the movable body on a basis of the value of each object estimated; and
controlling movement of the movable body in accordance with the planned action.

19. A non-transitory computer-readable medium having stored thereon computer-executable instructions, which when executed by an information processing device, cause the information processing device to execute operations, the operations, comprising:
analyzing a scene image comprising a plurality of objects captured by a movable body;
calculating a local-feature-amount vector of the scene image, wherein the local-feature-amount vector includes information regarding a local feature amount of each portion of each object of the plurality of objects in the scene image;
estimating a value of each object, of the plurality of objects at a periphery of the movable body based on the local-feature-amount vector of the scene image;
planning an action of the movable body on a basis of the value of each object estimated; and
controlling movement of the movable body in accordance with the planned action.

\* \* \* \* \*